United States Patent
Fogel et al.

(10) Patent No.: US 10,701,218 B1
(45) Date of Patent: *Jun. 30, 2020

(54) SYSTEM AND METHOD FOR DYNAMIC MULTIFACTOR ROUTING

(71) Applicant: InterMetro Communications, Inc., Simi Valley, CA (US)

(72) Inventors: Christopher Fogel, Simi Valley, CA (US); Charles Rice, Simi Valley, CA (US)

(73) Assignee: InterMetro Communications, Inc., Simi Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/377,073

(22) Filed: Apr. 5, 2019

Related U.S. Application Data

(63) Continuation of application No. 14/808,788, filed on Jul. 24, 2015, now Pat. No. 10,298,775, which is a continuation of application No. 13/367,133, filed on Feb. 6, 2012, now Pat. No. 9,124,957.

(60) Provisional application No. 61/485,425, filed on May 12, 2011, provisional application No. 61/440,301, filed on Feb. 7, 2011.

(51) Int. Cl.
*H04M 7/00* (2006.01)
*H04M 15/00* (2006.01)
*H04Q 3/66* (2006.01)

(52) U.S. Cl.
CPC .......... *H04M 15/8044* (2013.01); *H04Q 3/66* (2013.01)

(58) Field of Classification Search
CPC ...... H04M 15/00; H04M 15/41; H04M 15/43; H04M 3/5175

USPC .......... 379/265.02, 221.01, 114.03
See application file for complete search history.

(56) References Cited

U.S. PATENT DOCUMENTS

| | | | |
|---|---|---|---|
| 6,108,408 | A | 8/2000 | Plunkett |
| 6,226,365 | B1 | 5/2001 | Mashinsky |
| 7,242,759 | B1 | 7/2007 | Sanchez et al. |
| 7,953,218 | B2 | 5/2011 | Sanchez et al. |
| 9,124,957 | B1 | 9/2015 | Fogel et al. |
| 10,298,775 | B1 | 5/2019 | Fogel et al. |

(Continued)

OTHER PUBLICATIONS

Solution Interoperability Lab Application Notes, Intelligent Customer Routing with Acme Packet Session Border Controller using Avaya Aura TM Session Manager, Avaya Aura TM Communication Manager, and Avaya Voice Portal—Issue 1.0 (Sep. 23, 2009) in 87 pages.

*Primary Examiner* — Rasha S Al Aubaidi
(74) *Attorney, Agent, or Firm* — Knobbe Martens Olson & Bear LLP

(57) ABSTRACT

A system for selecting communication routes based on multiple criteria is disclosed. The system can dynamically update route ranking criteria without loading new data tables. Further, the system can be implemented in the context of a route ranking system that provides a list of routes for processing or completing a call. The list of routes can be generated in a ranked order to facilitate attempts to route the call based on the predefined routing criteria. Further, the route ranking system can determine the list of routes based on one or more criteria including, for example, margins, call type, and vendor ratings, to name a few. Advantageously, modifications can be made to values associated with the routing criteria without requiring the loading of new tables associated with the routing criteria. These modifications can be associated with an expiration condition thereby enabling increased flexibility in determining the list of routes.

20 Claims, 13 Drawing Sheets

(56) References Cited

U.S. PATENT DOCUMENTS

| | | |
|---|---|---|
| 2003/0055985 A1 | 3/2003 | Corb et al. |
| 2005/0190901 A1 | 9/2005 | Oborn |
| 2007/0047706 A1 | 3/2007 | Starling |
| 2008/0219265 A1 | 9/2008 | Fieremans et al. |
| 2008/0288486 A1 | 11/2008 | Kim |
| 2009/0041225 A1 | 2/2009 | Agarwal et al. |
| 2010/0079784 A1 | 4/2010 | Jackson et al. |
| 2011/0047022 A1 | 2/2011 | Walker et al. |
| 2011/0053513 A1 | 3/2011 | Papakostas |

SYSTEM AND METHOD FOR DYNAMIC MULTIFACTOR ROUTING

RELATED APPLICATIONS

This application is a continuation of U.S. application Ser. No. 14/808,788, filed on Jul. 24, 2015 and titled "SYSTEM AND METHOD FOR TRAFFIC BURST PROTECTION," which is a continuation of U.S. application Ser. No. 13/367,133, filed on Feb. 6, 2012 and titled "SYSTEM AND METHOD FOR DYNAMIC MULTIFACTOR ROUTING," which claims the benefit of priority under 35 U.S.C. § 119(e) of U.S. Provisional Patent Application No. 61/440,301, filed on Feb. 7, 2011, titled "SYSTEM AND METHOD FOR DYNAMIC MULTIFACTOR ROUTING," and of U.S. Provisional Patent Application No. 61/485,425, filed on May 12, 2011, titled "SYSTEM AND METHOD FOR DYNAMIC MULTIFACTOR ROUTING," the disclosures of which are hereby incorporated by reference in their entirety.

BACKGROUND

A phone call or communications service, such as fax, or voice-messaging, typically involves multiple communications carriers. This is typically true regardless of whether the call involves traditional landlines, cellular phones, or Voice over Internet Protocol (VoIP) services. Generally, each communications carrier organization that facilitates the call charges the previous call handler for processing the call and pays the subsequent call handler for continuing the connection process. The difference between the two payment rates is termed the margin. This margin is often quite small, but communications carrier organizations typically process a high number of calls resulting in large sums of money being transferred between carriers. Consequently, a small mistake in the identification of a payment rate can result in a large monetary impact for a communications carrier.

SUMMARY

The present disclosure provides a number of systems and associated processes for processing a call. One embodiment includes a communications carrier system that receives a call from a customer. The communications carrier system identifies call information associated with the call. This call information is provided to a route ranking system that is capable of ranking a plurality of vendors based on one or more ranking criteria. The communications carrier system receives a ranked list of vendors from the route ranking system, wherein each vendor identified in the ranked list is capable of processing the call. Then, the communications carrier system can provide the call to a vendor identified on the ranked list of vendors.

In one embodiment, the call information includes at least one or more of the following: an identity of the customer, an identity of a call destination, and an identity of the call type.

In one embodiment, the one or more ranking criteria is determined based, at least in part, on one or more of the following: the customer, the call information, vendor ranking preferences associated with the communications carrier system.

In one embodiment, providing the call to the vendor involves providing the call to a first vendor identified on the ranked list of vendors. The communications carrier system then determines if the call was successfully provided to the first vendor. If it is determined that the call was unsuccessfully provided to the first vendor, the communications carrier system provides the call to a second vendor identified on the ranked list of vendors, wherein the second vendor is ranked lower than the first vendor on the ranked list of vendors.

In one embodiment, the customer is a second communications carrier system.

In one embodiment, the vendor is a second communications carrier system.

In one embodiment, the call includes at least one of the following: a voice call, a data call, a fax call, a modem call, a voice over internet protocol (VoIP) call, a plain old telephone service (POTS) call, and a mobile phone call.

One embodiment provides a system for processing a call. During operation, the system receives call information associated with a call from a call processing system. The system determines one or more ranking criteria for ranking vendors based, at least in part, on the call information. Further, the system identifies vendors capable of processing the call. Then, the system ranks the vendors based, at least in part, on the one or more ranking criteria to obtain a list of ranked vendors. The system provides the call processing system with access to an identity of at least one vendor from the list of ranked vendors.

In one embodiment, the system determines a set of weights for weighting the one or more ranking criteria. Then, the system weights the one or more ranking criteria using the set of weights to obtain weighted ranking criteria. Further, the system ranks the vendors based, at least in part, on the weighted ranking criteria.

In a further embodiment, the set of weights are based, at least in part, on one or more of the following, a customer of the call processing system, a communications carrier; and the call information.

In a further embodiment, the system normalizes the weighted ranking criteria.

In one embodiment, the call information includes at least one or more of the following: an identify of a customer of the call processing system, an identity of a call destination, an identity of the call type, a priority associated with the call.

One embodiment provides a system for processing a call. During operation, the system receives call information associated with a call. The system determines one or more ranking criteria for ranking vendors based, at least in part, on the call information. Moreover, the system identifies vendors capable of processing the call. The system then ranks the vendors based, at least in part, on the vendor determination factors to obtain a list of ranked vendors. Further, the system identifies a first vendor from the list of ranked vendors. Then, the system provides the call to the first vendor.

One embodiment provides a system for performing traffic burst protection. During operation, the system receives, at a communications carrier, call information associated with a call. Then, the system identifies a first route ranking system configured to provide a ranked list of vendors to process the call. The system then determines if the first route ranking system associated with the communications carrier system has a first capacity to process the call. In response to determining that the first route ranking system has the first capacity to process the call, the system provides the first route ranking system with access to the call information.

In one embodiment, determining whether the first route ranking system has the first capacity to process the call further comprises determining one or more of the following: a rate at which the first route ranking system is processing calls; a number of calls in a call processing queue; and an estimated time-to-process for the call.

In one embodiment, in response to determining that the first route ranking system does not have the first capacity to process the call, the system identifies a second route ranking system configured to provide the ranked list of vendors to process the call. The system then determines if the second route ranking system associated with the communications carrier system has a second capacity to process the call. In response to determining that the second route ranking system has the second capacity to process the call, the system provides the second route ranking system with access to the call information.

One embodiment provides a system for processing a call. During operation, the system receives call information associated with a call from a call processing system. The system then determines one or more ranking criteria for ranking vendors based, at least in part, on the call information. Further, the system accesses vendor data associated with the vendors and the one or more ranking criteria. The system also receives an updated value associated with the one or more ranking criteria. Further, the system identifies vendors capable of processing the call. Then, the system ranks the vendors based, at least in part, on the vendor data and the updated value to obtain a list of ranked vendors. The system is further configured to provide the call processing system with access to an identity of at least one vendor from the list of ranked vendors.

In one embodiment, the vendor data is accessed from a data repository.

In a further embodiment, in response to receiving the updated value, data associated with the data repository remains unmodified.

In a further embodiment, the data repository stores one or more of: vendor data, customer data, and data associated with the call processing system.

In one embodiment, the updated value is associated with a expiration value.

In a further embodiment, ranking the vendors further comprises the system determining if the expiration value has been satisfied. In response to determining that the expiration value has been satisfied, the system ranks the vendors without the updated value.

In one embodiment, the updated value can be associated with one or more of the following: the vendor data, customer data, and data associated with the call processing system.

One embodiment provides a system for processing a call. During operation, the system receives a call from a customer at a communications carrier system. The system then identifies call information associated with the call. Further, the system determines a trust level associated with the customer. In response to determining that the trust level satisfies a trust threshold, the system determines whether the call information includes Local Number Portability (LNP) information. If so, the system processes the call, based at least in part, on the LNP information. If not, the system processes the call without using LNP information.

In one embodiment, in response to determining that the trust level does not satisfy the trust threshold, the system accesses an LNP repository. The system then determines if the LNP information exists at the LNP repository. If so, the system processes the call, based at least in part, on the LNP information. If not, the system processes the call without using LNP information.

In one embodiment, the trust level is based, at least in part, on one or more of the following: a size of the customer, an accuracy rating of previously provided LNP information, and a relationship time period between the communications carrier system and the customer.

One embodiment provides a system for processing a call. During operation, the system receives a new rate table at a communications carrier system. Further, the system determines a rate trend based, at least in part, on previously received rate tables. The system also determines whether the new rate table satisfies the rate trend. In response to determining that the new rate table satisfies the rate trend, the system processes a call based, at least in part, on the new rate table.

In one embodiment, the system identifies a new rate table trigger event. The system then determines if the new rate table trigger event has occurred. In response to determining that the new rate table trigger event has occurred and that the new rate table satisfies the rate trend, the system processes the call based, at least in part, on the new rate table.

In a further embodiment, the system ceases using a previously received rate table to process the call in response to the new rate table trigger event occurring.

In one embodiment, to determine whether the new rate table satisfies the rate trend, for each rate in the new rate table, the system calculates an expected value based, at least in part, on the previously received rate tables. The system then determines whether a difference between the expected value and the rate satisfies a rate variance threshold.

In a further embodiment, the rate variance threshold includes a first value for when the rate is less than the expected value and a second value for when the rate is greater than the expected value.

In one embodiment, in response to determining that the new rate table does not satisfy the rate trend, the system alerts an administrator associated with the communications carrier system.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION OF SPECIFIC EMBODIMENTS

Introduction

Figure 1:
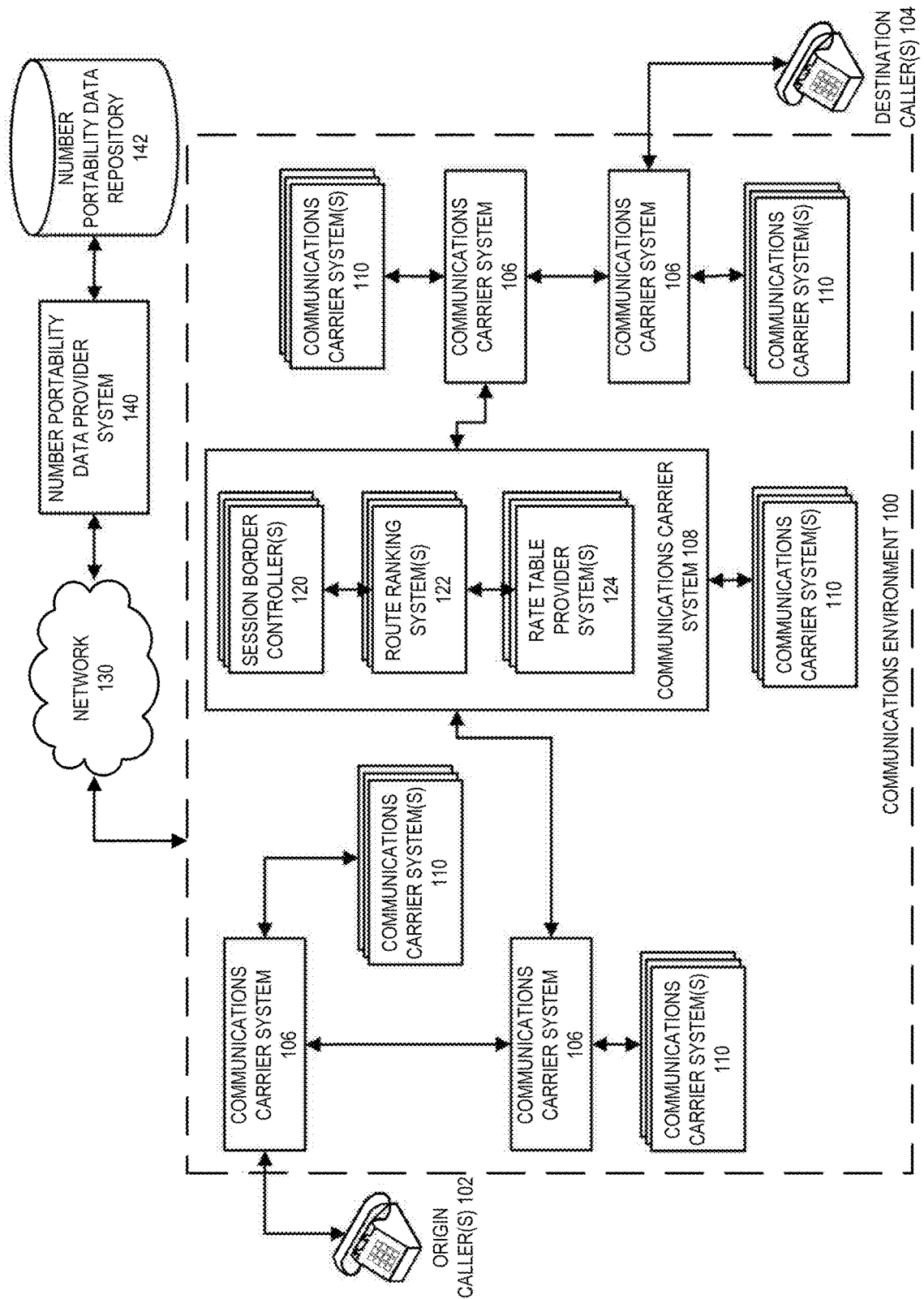
FIG. 1 illustrates an embodiment of a communications environment in accordance with the teachings of the present disclosure.

A number of communications carrier organizations decide how to route calls based on the margin between what communications carrier customers are charged and what communications carrier vendors charge. These communication carrier customers are the communications carrier organizations who are requesting that a call be routed by a specific communications carrier organization, and the communications carrier vendors are the communications carrier organizations that could potentially route the call for the specific communications carrier organization. It is often the case that a communications carrier customer for one call can be a communications carrier vendor for another call, and vice versa. The margin is calculated, for example, by using prices associated with a customer or vendor for a particular call region, or Local Access and Transport Area (LATA). Alternatively, the prices may be associated with any other calling plan, such as the NPA-NXX system associated with the North American Numbering Plan (NANP).

In many cases, the prices are entered into tables by an administrator. These tables can be accessed by routing systems to determine how to most profitably route a call. Due to the small margins on a single call, and the high rate at which calls are handled, a single mistake in the tables can cost a communications carrier a significant sum of money in a short period of time. Further, there currently exists little flexibility beyond comparing margins for deciding which vendor to route a call. Moreover, each time there is a change to a customer rate, or to a vendor rate, whether it is a planned change or a correction of a mistake, the entire table associated with the customer or the vendor must be reloaded. These table updates can be an expensive process in terms of both time and human resources. Further, the databases that store the tables are unavailable while the tables are being updated.

This disclosure describes a number of systems and associated processes that provide for the selection of routes based on multiple variables or criteria. Further, this disclosure describes a number of systems and associated processes that enable dynamic updates to customer rates, vendor rates, and any other selected routing criteria without the need to load new tables. In certain embodiments, these systems and processes can be implemented in the context of a route ranking system that provides a list of routes for processing or completing a call. The list of routes can be generated in a ranked order to facilitate attempts to route the call based on the predefined routing criteria. In certain embodiments, the route ranking system can determine the list of routes based on one or more criteria including, for example, margins, call type, and vendor ratings, to name a few. Advantageously, in some embodiments, modifications can be made to values associated with the routing criteria without requiring the loading of new tables associated with the routing criteria. Further, in some embodiments, the modifications can be associated with an expiration condition advantageously enabling increased flexibility in determining the list of routes. These and other features are described in greater detail below with respect to the Figures.

Example Communications Environment

FIG. 1 illustrates an embodiment of a communications environment 100 in accordance with the teachings of the present disclosure. In the communications environment 100, an origin caller 102 can make a call to a destination caller 104. The call is not limited in type. For example, the call can be: a telephone call placed via mobile phone, landline phone, or a combination; a facsimile call; a Voice over Internet Protocol (VoIP) call; or a modem call; to name a few. Further, the origin caller 102 and the destination caller 104 can include any user or organization capable of placing the call.

To establish the call connection between the origin caller 102 and the destination caller 104, the call is routed among a number of communications carrier systems associated with a number of communications carrier organizations. Each communications carrier organization may be associated with one or more communications carrier systems and generally, although not necessarily, each communications carrier system is associated with a single communications carrier organization. In one embodiment, the call is routed between the communications carrier systems 106 and 108. The communications carrier systems 110 represent additional communications carrier systems that, in some embodiments, could also facilitate in routing the call. The communications carrier systems 106, 108, and 110 can include any system capable of processing and routing a call. These systems can be associated with any communications carrier organization, such as InterMetro Communications. Generally, each communications carrier system is associated with a communications network (not shown) that the communications carrier organization owns or rents. Further, each communications network can include a number of computing devices to facilitate communications within the communications carrier's network and between various communications carrier systems. Some non-limiting examples of these computing devices are illustrated in FIG. 1 with respect to the communications carrier 108 and are described further below. Although the communications carrier systems 106, 108, and 110 are depicted similarly, in some embodiments, the communications carrier systems 106, 108, and 110 can have varying configurations. For example, one communications carrier system may include multiple route ranking systems 122, another communications carrier system may include a single route ranking system 122, and yet another communications carrier system may not include a route ranking system, but instead may hard-code routes into a dial plan associated with a session border controller 120.

As used herein, the term "customer" is used interchangeably to refer to a communications carrier system and to a communications carrier organization associated with the communications carrier system that is providing a call to another communications carrier system for routing. Further, as used herein, the term "vendor" is used interchangeably to refer to a communications carrier system and to a communications carrier organization associated with the communications carrier system capable of receiving the call for routing in an attempt to complete the call connection. As will be apparent from the context in which it is used, the terms "customer" and "vendor" are also sometimes used herein to refer only to the communications carrier system or only to the organization associated with the communications carrier system. In some embodiments, the customer may be the origin caller 102. Further, the vendor may be the destination caller 104.

When routing a call, each communications carrier system 106 and 108 can determine to which communications carrier system to route the call based on a number of factors. These factors can include, for example: origin of the call; the destination of the call; the price charged to the communications carrier organization that provided the call (the customer); and the price charged by communications carrier organizations able to accept the call (the vendors), to name a few. The factors are discussed in more detail below.

Although only one communications path is illustrated in FIG. 1 as connecting the origin caller 102 to the destination caller 104 via the communications carrier systems 106 and 108, it is possible for additional paths to exist to connect the origin caller 102 with the destination caller 104. Further, note that each communications carrier system can communicate with a number of communications carrier systems, such as the communications carrier systems 110.

In one embodiment, the communications carrier system 108 includes one or more session border controllers 120, route ranking systems 122, and rate table provider systems 124. Although not depicted, it is possible for each communications carrier system 106 and 110 to include one or more session border controllers 120, route ranking systems 122, and rate table provider systems 124.

When a call is routed from the communications carrier system 106 to the communications carrier system 108, the session border controllers 120 handle the communication between the communications carrier system 106 and 108. To determine to which communications carrier system to route the call, the session border controllers 120 provide call information associated with the call to the route ranking systems 122. The route rankings systems 122 then use price or rate information associated with the communications carrier systems 106, to determine a ranked order routing list of communications carrier systems 106 to which to route the call. In one embodiment, a number of additional factors are used to determine the ranked order routing list. These additional factors are described in more detail below. In one embodiment, the route ranking systems 122 obtain the rate information from the rate table provider systems 124. In one embodiment, the route ranking systems 122 can include the rate table provider systems 124.

The session border controllers 120 can include any system that can receive a call. This call may be received from a communications carrier system 106, a session border controller associated with the communications carrier system 106, the origin callers 102, the destination callers 104, or any other system capable of providing the call to the session border controllers 120. Further, session border controllers 120 can include any system that can provide a call to another system. This call can be provided to a communications carrier system 106, a session border controller associated with the communications carrier system 106, the origin callers 102, the destination callers 104, or any other system capable of receiving the call from the session border controllers 120. In addition, the session border controllers 120 can include any system capable of providing call information associated with a call to route ranking systems 122 and, in response, receiving a ranked order routing list of communications carrier systems 106. In one embodiment, the session border controllers 120 can include the route ranking systems 122.

The route ranking systems 122 can include any system capable of receiving call information associated with a call and determining a ranked order routing list of communications carrier systems 106 to which to route the call. For example, the route ranking system 122 can be implemented by one or more computing systems and each computing system can include one or more processors. The route ranking systems 122 is described in more detail below with respect to FIG. 2.

The rate table provider system 124 can include any system capable of storing prices or rates for charging an organization associated with communications carrier system 106 for processing and routing a call received from the communications carrier system 106. Further, the rate table provider system 124 can include any system capable of storing prices or rates charged by the organization associated with the communications carrier system 106 for processing and routing a call received from the communications carrier system 108.

In one embodiment, to facilitate selecting a communications carrier system to which to route the call, Local Number Portability (LNP) information is obtained from a number portability data provider system 140. This LNP information can be used to identify whether ownership of a phone number associated with the call has been transferred from one communications carrier organization to another communications carrier organization. LNP information can be useful for accurately determining the rate that a communications carrier organization will charge to route a call.

The number portability data provider system 140 can include any system that maintains LNP information and makes the LNP information available to communications carrier systems and/or associated communications carrier organizations. For example, the number portability data provider system 140 can include Neustar™.

The number portability data store 142 can include any system for storing LNP information. In one embodiment, the number portability data provider system 140 can store LNP information on and retrieve LNP information from the number portability data store 142. In one embodiment, the number portability data provider system 140 can include the number portability data repository 142.

In one embodiment, one or more of the communications carrier systems 106, 108, and 110, can communicate with the number portability data provider system 140 via the network 130. The network 130 may include any system for allowing computing devices associated with the communications carrier systems to communicate with other computing devices. For example, the network 130 can be a LAN, a WAN, the Internet, combinations of the same, or the like. Although depicted independently of the communications environment 100, in some embodiments, one or more of the network 130, the number portability data provider system 140, and the number portability data store 142 can be included in the communications environment 100.

Route Ranking System

Figure 2:
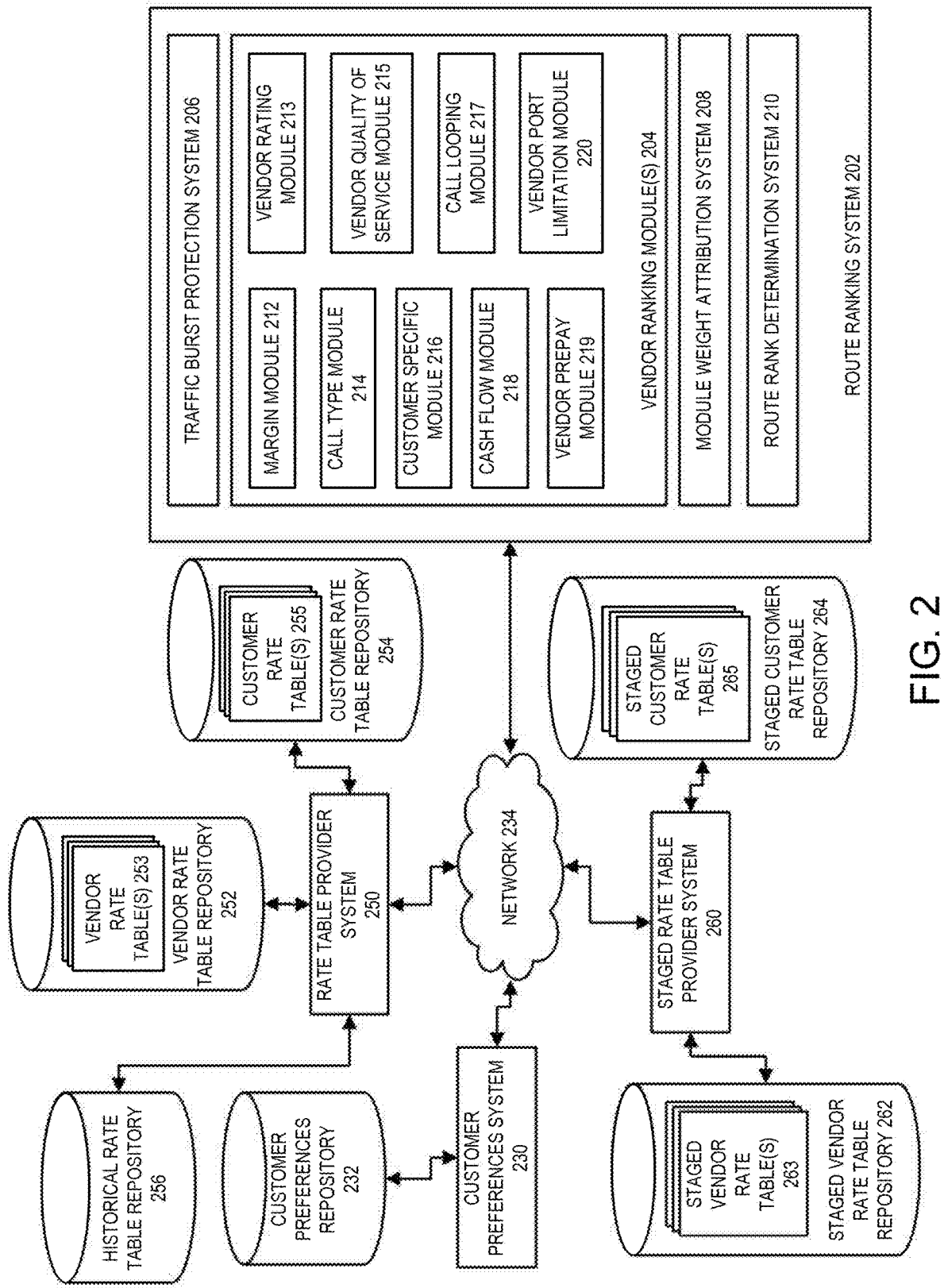
FIG. 2 illustrates an embodiment of a route ranking system in accordance with the teachings of the present disclosure.

FIG. 2 illustrates an embodiment of a route ranking system 202 in accordance with the teachings of the present disclosure. In addition, FIG. 2 illustrates a number of systems and table repositories that facilitate the operation of the route ranking system 202. In one embodiment, although depicted separately, each of the various systems and table repositories illustrated in FIG. 2 can be included with the route ranking system 202. In one embodiment, the route ranking system 202 can be associated with any communications carrier organization or other organization that rents or owns a route ranking system. To simplify discussion, the route ranking system 202 will be assumed to be associated with the communications carrier system 108.

In one embodiment, in response to a communications carrier system receiving a call, the route ranking system 202 receives call information associated with the call. The route ranking system 202 processes the call information using a number of vendor ranking modules 204 to determine a ranked order routing list. The ranked order routing list identifies, in a ranked order, communications carrier systems that meet a set of predetermined criteria and are capable of routing the call to facilitate completing the call connection. The route ranking system 202 includes any system capable of determining the ranked order routing list for a call based on a number of predetermined criteria or factors. In one embodiment, the various vendor determination modules 212-220 can evaluate the predetermined criteria or factors to facilitate determining the ranked order routing list for a call. Note that the depicted vendor determination modules 212-220 are examples of routing criteria modules and are not limited to those illustrated in FIG. 2. In one embodiment, the vendor ranking modules 204 can include a vendor determination module for some or all criteria that a communications carrier organization desires to use to identify vendors for routing a call. The vendor determination modules 212-220 can be implemented in hardware, software, or a combination. For example, one or more of the vendor determination modules 212-220 can be implemented by one or more computing systems that can include one or more processors. In one embodiment, one or more vendor determination modules can be added or removed from the vendor ranking modules 204.

In one embodiment, the route ranking system 202 includes a module weight attribution system 208 that can apply weighted values to the vendor determination modules 212-220 associated with the vendor ranking modules 204.

In one embodiment, the route ranking system 202 includes a route rank determination system 210 that calculates the ranked order routing list based on the determinations of the vendor ranking modules 204, which are described below. Alternatively, the route rank determination system 210 calculates the ranked order routing list based on the weighted determinations of the vendor ranking modules 204 calculated by the module weight attribution system 208. In one embodiment, one or more of the vendor ranking modules 204 provide vendor rankings to the route ranking determination system 210, which can then combine the vendor rankings based on weights applied by the module weight attribution system 208. In one embodiment, one or more of the vendor ranking modules 204 cause the route rank determination system 210 to modify the ranked order routing list based on: filtering the available vendors and/or applying weights to the available vendors.

The margin module 212 can include any system for determining the vendors that will provide the greatest rate margin for a call. For example, the margin module 212 can be implemented by one or more computing systems, which can include one or more processors. In one embodiment, the margin module 212 determines one or more rate margins by determining the difference between a customer rate and one or more vendor rates. Determining the customer rate can include accessing a customer rate associated with a customer and a call destination from a customer rate table 255 stored at a customer rate table store 254. Determining the one or more vendor rates can include accessing one or more vendor rates associated with one or more vendors and a call destination from a vendor rate table 253 stored at a vendor rate table store 252. The customer rate table repository 254 and the vendor rate table store 252 can be accessed via a rate table provider system 250. The rate table provider system 250 can include any system configured to manage and provide access to the customer rate table repository 254 and/or the vendor rate table store 252. In one embodiment, the route ranking system 202 includes one or more of the rate table provider system 250, the vendor rate table repository 252, and the customer rate table store 254.

The vendor rate table repository 252 can include any system for storing vendor rate tables 253. The vendor rate tables 253 include prices or rates associated with one or more of vendors and call destinations. In one embodiment, each vendor may be associated with a different rate for each call destination, or for various groups of call destinations. The customer rate table store 254 can include any system for storing customer rate tables 255. The customer rate tables 255 can include prices or rates associated with one or more of customers and call destinations. In one embodiment, each customer may be associated with a different rate for each call destination, or for various groups of call destinations.

In one embodiment, the margin module 212 ranks the vendors based on the one or more rate margins. In one embodiment, rate modifiers and/or updated rates can be provided to the margin module 212. These rate modifiers and/or updated rates can be used to adjust or modify vendor rankings based on margin without modifying one or more of the vendor rate tables 253 and the customer rate tables 255. In one embodiment, the rate modifiers and/or updated rates can be provided by an administrator or by an automated system. In one embodiment, updated rates or updated values can be used to modify the determinations of any of the vendor ranking modules 204. The process of dynamically adjusting one or more of the rate margin, the vendor ranking, and the determinations of the vendor ranking modules 204 is further described below with reference to FIG. 6.

The vendor rating module 213 can include any system for identifying available vendors based on a rating associated with the vendors and one or more of the customer, the call origin associated with origin caller 102, and the call destination associated with the destination caller 104. In one embodiment, the communications carrier system 108 or organization associated with the communications carrier system 108 can assign the rating to the vendor based on one or more of: the size of the vendor and/or the vendor's communications network, a vendor rating from a third party, historical interactions with the vendor, a reputation associated with the vendor, and any other factor that can be used to create a rating for a vendor. For example, an administrator associated with the communications carrier system 108 can configure the vendor rating module 213 to provide a list of only large vendors, as defined by the administrator, to the route rank determination system 210 for any call provided by a specific customer. As a second example, the administrator can configure the vendor rating module 213 to provide a list of tier 1 and tier 2 rated vendors, as defined by a third-party telecommunications rating service, to the route rank determination system 210 for any call provided by the largest customer of the organization associated with the communications carrier system 108.

The call type module 214 can include any system for identifying available vendors based on a call type associated with a call. In one embodiment, the call type module 214 can filter out specific vendors based on the call type associated with the call. In one embodiment, the call type module 214 can filter vendors based on any criteria including whether the call is: a fax call; a modem call; an international call; an interstate call; an intrastate call; a toll-free call; or a premium-rate call, such as 1-900-###-#### number in the North American Numbering Plan, to name a few. In one embodiment, the route rank determination system 210 can create the ranked order routing list based on vendors provided by the vendor ranking modules 204 that were not filtered out by the call type module 214.

The vendor quality of service module 215 includes any system that can rank vendors based on one or more quality of service factors. In one embodiment, the quality of service factors can include: a Post Dial Delay (PDD) value, packet loss, latency, an Answer/Seizure Ratio (ASR), a call clarity rating; a dropped call rate; and a Network Effectiveness Ratio (NER), to name a few.

The customer specific module 216 includes any system that can rank vendors based on criteria specified by the customer. In one embodiment, the customer can configure the customer specific module 216. Alternatively, the customer can provide the customer specified criteria to an administrator associated with the communications carrier system 108 and the administrator can configure the customer specific module 216. In one embodiment, the customer can specify a weight to apply to the customer specific module 216 by the module weight attribution system 208. The weight applied to the customer specific module 216 can be limited to a threshold weight determined by the communications carrier system 108. Advantageously, in some embodiments, limiting the weight for the customer specific module 216 ensures that a customer cannot use the customer specific module 216 to circumvent routing criteria set by the communications carrier system 108, or associated organization, via the vendor ranking modules 204.

The call looping module 217 can include any system that can modify the ranked order routing list based on the likelihood of call looping. Call looping occurs when, for example, a first communications carrier system routes a call to a second communications carrier system, which routes the call to a third communications carrier system, which routes the call back to the first communications carrier system. Generally, call looping occurs because each communications carrier system is only aware of the customer that provided the call, and the vendor to which the communications carrier system is routing the call. In one embodiment, the call looping module 217 can store call history for a predetermined period of time at the route ranking system 202 or at a call history store (not shown) associated with the route ranking system 202. In one embodiment, the call looping module 217 monitors how often a call matches a call associated with the call history over a predefined period of time. The match can be based on any type of call identification data including the origin caller 102 and the destination caller 104. If the number of matches over the predefined period of time satisfies a threshold, the call looping module 217 can cause the route rank determination system 210 to adjust the ranked order routing list. In one embodiment, the threshold can be any number of matches including one match.

The cash flow module 218 can include any system that can rank vendors based on cash flow criteria. The cash flow criteria can include any criteria associated with paying a vendor. For example, the cash flow criteria can include one or more of: the frequency with which the organization associated with the communications carrier system 108 must pay the vendor, e.g. weekly, monthly, bi-monthly, etc.; the method for paying the vendor; the frequency with which the customer pays the communications carrier 108; and the method with which the customer pays the organization associated with the communications carrier system 108; to name a few.

The vendor prepay module 219 can include any system that can rank vendors based on one or more prepay criteria. This prepay criteria can include any criteria associated with prepaying a vendor. For example, the prepay criteria can include one or more of: whether the organization associated with the communications carrier system 108 has prepaid the vendor; how much credit associated with the prepayment is remaining; the amount of liquid funds the organization associated with the communications carrier system 108 has available to pay the vendor; and the amount of credit the organization associated with the communications carrier system 108 has available to pay the vendor; to name a few. In one embodiment, the cash flow module 218 can include the vendor prepay module 219. In this embodiment, the cash flow module 218 can take into account prepay criteria in determining a vendor ranking list to provide to the route rank determination system 210. For example, if the cash flow module 218 is configured on the basis that the organization associated with the communications carrier system 108 is low on liquid funds, the cash flow module 218 may rank a vendor that bills on a monthly basis and has been prepaid $1,000 above a vendor that bills on a weekly basis and has not been prepaid.

The vendor port limitation module 220 can include any system that can rank vendors based on port limitation criteria. This port limitation criteria can include any criteria associated with the vendor's ability to handle call traffic. For example, the port limitation criteria can include one or more of: the number of communications ports associated with the vendor; the types of communication ports associated with the vendor; the amount of traffic the vendor can process; and the amount of traffic the communications carrier system 108 has routed to the vendor over a predetermined period of time, to name a few.

In one embodiment, one or more of the vendor ranking modules 204 can be configured to provide a ranked list of vendors that satisfy a threshold. For example, the margin module 212 can be configured to provide a ranked list of vendors for a call that would result in a margin of at least 2 cents.

In one embodiment, the route rank determination system 210 uses a subset of the vendor ranking modules 204 to determine the ranked order routing list. The subset of vendor ranking modules 204 used to determine the ranked order routing list can be based on one or more of the customer, the call origin, and the call destination. In one embodiment, the route rank determination system 210 uses a customer preferences system 230 to determine the subset of vendor ranking modules 204 to determine the ranked order routing list for a customer. In one embodiment, the customer preferences system 230 includes any system that can store and access vendor determination preferences on a customer preference store 232. In one embodiment, the route ranking system 202 includes the customer preference system 230 and/or the customer preferences repository 232. In one embodiment, one or more of the customer and an administrator associated with the communications carrier system 108 can specify the vendor ranking modules 204 to use to determine the ranked order routing list for the customer.

In one embodiment, the route ranking system 202 includes a traffic burst protection system 206. The traffic burst protection system 206 can include any system that can identify whether the route ranking system 202 has the capacity to process a call. Determining whether the route ranking system 202 has the capacity to process the call can include determining if the route ranking system 202 has received more than a threshold number of calls for processing during a predetermined time period. Although depicted as part of the route ranking system 202, the traffic burst protection system 206 can be included with a session border controller 120, or can be a discrete system that determines whether the route ranking system has the capacity to process the call before providing the call or call information associated with the call to the route ranking system 202. The traffic burst protection system 206 is described in more detail with respect to FIG. 4.

In one embodiment, the route ranking system 202 can include one or more of the rate table provider system 250, the staged rate table provider system 260, and the customer preferences system 230. In one embodiment, the route ranking system 202 can communicate with one or more of the rate table provider system 250, the staged rate table provider system 260, and the customer preferences system 230 via the network 234. The network 234 may include any system for allowing multiple computing devices to communicate with each other. For example, the network 234 can be a LAN, a WAN, the Internet, combinations of the same, or the like.

The staged rate table provider system 260 includes any system for accessing and managing the staged customer rate table store 264 and/or the staged vendor rate table repository 262. In one embodiment, the staged customer rate table store 264 and the staged vendor rate table repository 262 enable the communications carrier system 108 to update rate tables without interrupting the route ranking system 202. In one embodiment, the staged customer rate table store 264 and the staged vendor rate table repository 262 enable the communications carrier system 108, or associated organization, to pre-schedule rate table updates. Updating rate tables is discussed in more detail below with respect to FIG. 8.

Call Routing

Figure 3:
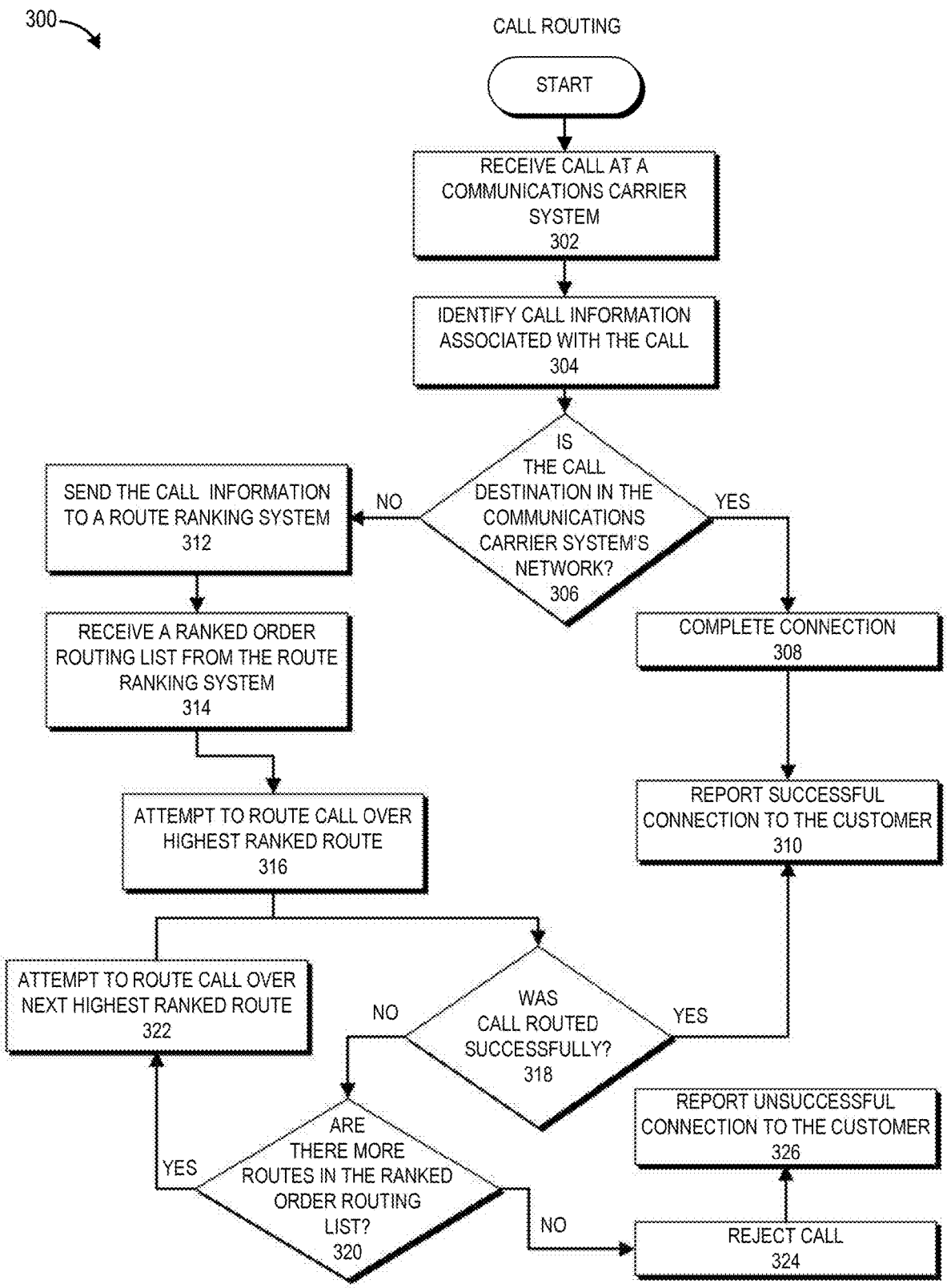
FIG. 3 illustrates a flow diagram for one embodiment of a call routing process in accordance with the teachings of the present disclosure.

FIG. 3 illustrates a flow diagram for one embodiment of a call routing process 300 in accordance with the teachings of the present disclosure. The process 300 can be performed by any system capable of routing a call including a communications carrier system 106 that initially received a call from the origin caller 102, a communications carrier system 106 that completed the final call connection to the destination caller 104, or a communications carrier system somewhere in between. In one embodiment, a session border controller associated with the communications carrier system can perform the process 300. To simplify discussion, the process 300 will be described in terms of the communications carrier system 108.

The process begins at block 302 when, for example, the communications carrier system 108 receives a call. In one embodiment, the session border controller 120 receives the call. At block 304, call information associated with the call is identified. This call information can include, for example, one or more of: a number associated with the origin caller 102, a number associated with the destination caller 104, the identity of the customer, and LNP information, if any.

At decision block 306, the communications carrier system 108 determines if the call destination associated with the call is within the communications network associated with the communications carrier system 108. This determination can be based on a number of factors, including, for example, the number associated with the destination caller 104. If the call destination is within the communications network associated with the communications carrier system 108, the call connection is completed at block 308. At block 310, the communications carrier system 108 reports the successful completion of the call to the customer that provided the call to the communications carrier system 108. In one embodiment, reporting the successful completion of the call involves providing call statistics associated with the call to the customer. These call statistics can include: a Post Dial Delay (PDD) value, an Answer/Seizure Ratio (ASR), jitter, packet loss, latency, and call duration, to name a few. In one embodiment, block 310 is optional.

If the call destination is not within the communications network associated with the communications carrier system 108, the call information is sent to a route ranking system 122 at block 312. At block 314, a ranked order routing list based on the call information is received from the route ranking system 122. At block 316, the communications carrier system 108 attempts to route the call over the highest ranked route identified in the ranked order routing list. Attempting to route the call can include providing the call to the vendor, or communications carrier system, associated with the highest ranked route identified in the ranked order routing list. The communications carrier system 108 determines at decision block 318 whether the call was routed successfully. In one embodiment, determining whether a call was successfully routed can include determining if the vendor accepted the call. In one embodiment, determining whether a call was successfully routed can include determining if the vendor reported the successful completion of the connection.

If the call was routed successfully, the communications carrier system 108 reports successful connection to the customer at block 310. In one embodiment, block 310 is optional.

If the call was not routed successfully, the communications carrier system 108 determines if there are more routes in the ranked order routing list at decision block 320. If there are more routes in the ranked order routing list, the communications carrier system 108 attempts to route the call over the next highest ranked route at block 322. If there are no more routes in the ranked order routing list, the communications carrier system 108 rejects the call at block 324. At block 326, the communications carrier system 108 can report the unsuccessful call connection to the customer. In one embodiment, reporting the unsuccessful call connection can include providing a reason why the call routing failed. In one embodiment, the reason can include: no vendors available that match the customer's vendor criteria; the communications carrier system 108 does not currently have enough capacity to process the call; a busy signal was received from the destination caller 104, or any other reason for a call connection failing. In one embodiment, block 326 is optional.

Traffic Burst Protection

Figure 4:
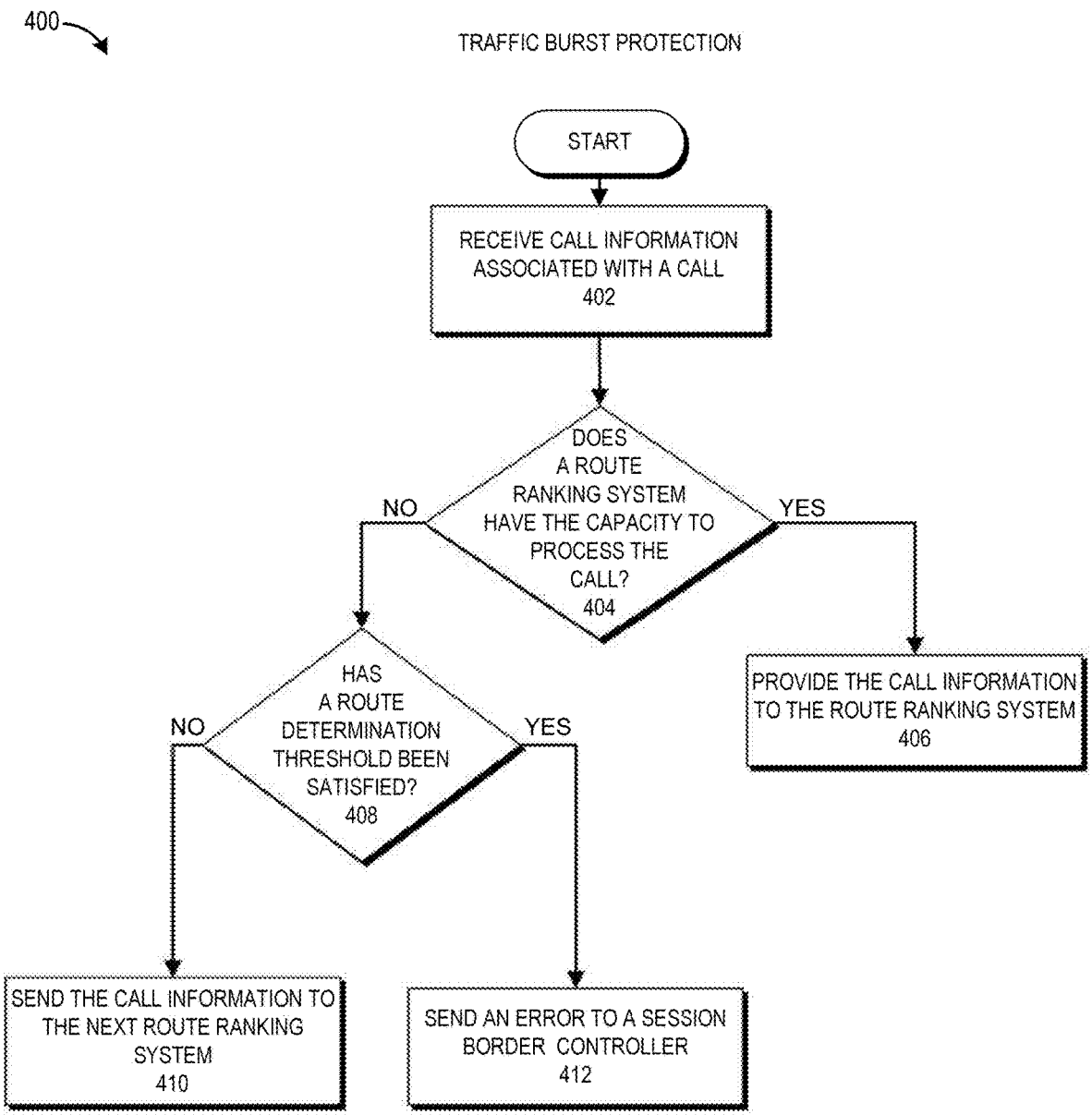
FIG. 4 illustrates a flow diagram for one embodiment of a traffic burst protection process in accordance with the teachings of the present disclosure.

FIG. 4 illustrates a flow diagram for one embodiment of a traffic burst protection process 400 in accordance with the teachings of the present disclosure. The process 400 can be performed by any system capable of preventing a route ranking system, such as route ranking system 202, from exceeding capacity. In one embodiment, the capacity of the route ranking system 202 is limited by the rate at which the route ranking system 202 can access one or more data repositories, such as, for example, the vendor rate table repository 252, associated with the route ranking system 202. In one embodiment, the capacity of the route ranking system 202 is limited by the number of ports associated with the route ranking system 202, or any other computing resource associated with the route ranking system 202 that can create a bottleneck in the route ranking system 202 processing a call. In one embodiment, the process 400 can be performed by one or more of: a session border controller associated with the route ranking system; a route ranking system controller (not shown) that is capable of regulating traffic to one or more route ranking systems; and any other system capable of preventing the route ranking system 202 from exceeding capacity. To simplify discussion, the process 400 will be discussed as being performed by the traffic burst protection system 206.

The process begins at block 402 when, for example, the traffic burst protection system 206 receives call information associated with a call. In one embodiment, the traffic burst protection system 206 is included with the route ranking system 202. Alternatively, the traffic burst protection system 206 is separate from the route ranking system 202.

At decision block 404, the traffic burst protection system 206 determines if a route ranking system 202 has the capacity to process the call. In one embodiment, determining if the route ranking system 202 has the capacity to process the call can include determining if the number of calls the route ranking system 202 has received and/or processed in a predetermined time period exceeds and/or equals a predetermined threshold. If the route ranking system 202 does have the capacity to process the call, the traffic burst protection system 206 provides the call information to the route ranking system 202 at block 406.

If the route ranking system 202 does not have the capacity to process the call, the traffic burst protection system 206 determines if a route determination threshold has been satisfied at decision block 408. The route determination threshold can include any factor for determining whether to continue attempting to find a route ranking system with the capacity to process the call. For example, the route determination threshold can be based on one or more of: the amount of time the communications carrier system 108 has been attempting to process the call; the number of route ranking systems that have been checked for capacity; and the customer that provided the call, to name a few.

If the route determination threshold has not been satisfied, the traffic burst protection system 206 sends the call information to the next route ranking system at block 410. In one embodiment, sending the call information to the next route ranking system can include sending the call information to a traffic burst protection system associated with the next route ranking system. In one embodiment, sending the call information to the next route ranking system can include the traffic burst protection system 206 using process 400 to determine if the next route ranking system has the capacity to process the call. In one embodiment, the next route ranking system can be randomly selected, or predefined.

If the route determination threshold has been satisfied, the traffic burst protection system 206 causes an error to be sent to a session border controller at block 412. In one embodiment, the error is sent to the session border controller that provided the call information to the traffic burst protection system 206 or to the initial traffic burst protection system that first received the call information. In one embodiment, the error can be sent to a random session border controller associated with the communications carrier system 108. In one embodiment, the error can be sent to a predefined session border controller associated with the communications carrier system 108. In one embodiment, the error is provided to the communications carrier system 108, or an administrator associated with the communications carrier system 108 and/or the route ranking system 202. In one embodiment, the error can include a message specifying why the route ranking system 202 did not provide a ranked order routing list. In one embodiment, block 412 is optional.

Ranked Order Routing List

Figure 5:
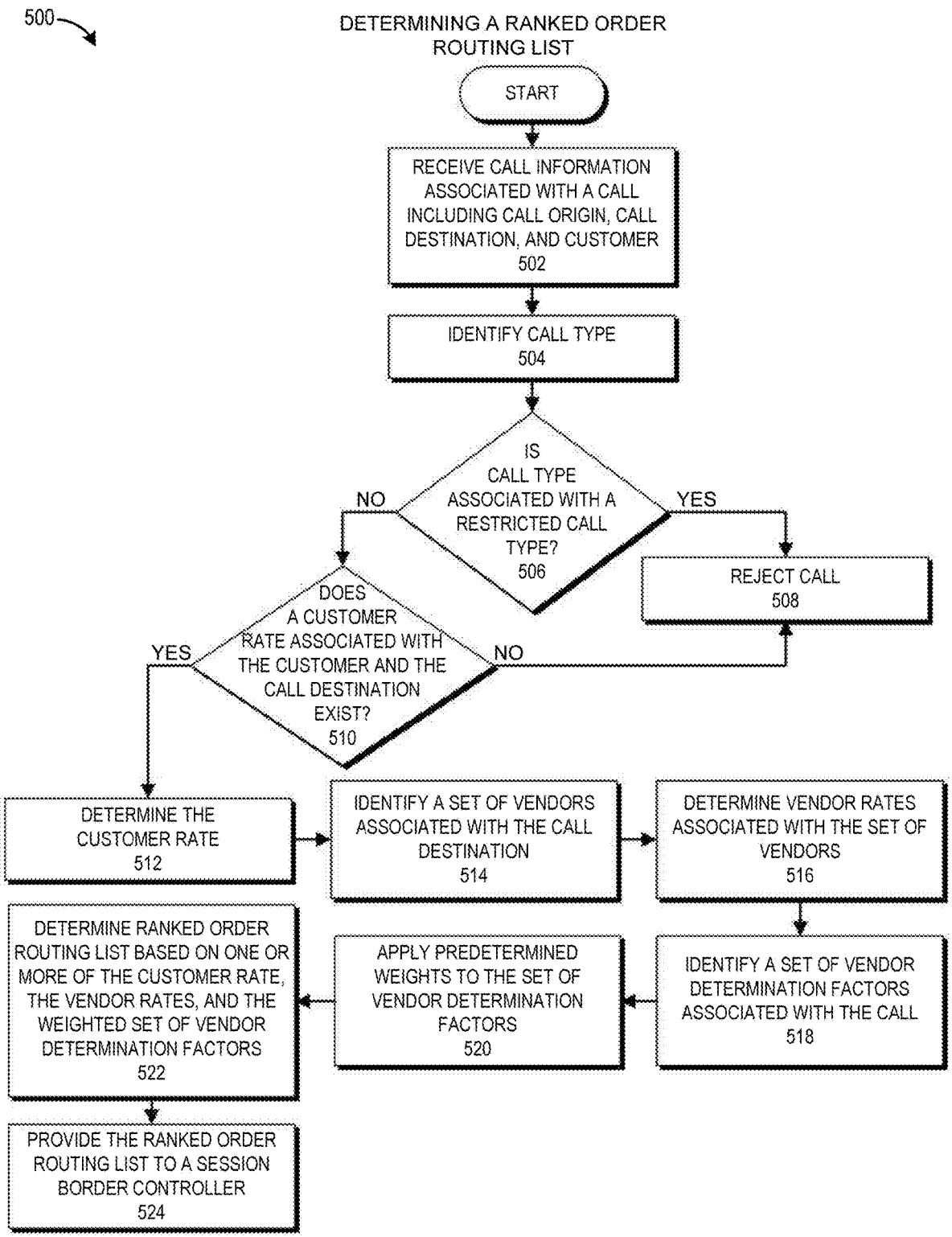
FIG. 5 illustrates a flow diagram for one embodiment of a process for determining a ranked order routing list in accordance with the teachings of the present disclosure.

FIG. 5 illustrates a flow diagram for one embodiment of a process 500 for determining a ranked order routing list in accordance with the teachings of the present disclosure. The process 500 can be performed by any system capable of determining a priority order of routes based on one or more predefined criteria or factors for routing a call. In one embodiment, process 500 can be performed by route ranking system 202.

The process begins at block 502 when, for example, the route ranking system 202 receives call information associated with a call, including: the call origin, the call destination, and the identity of a customer that provided the call to the communications carrier system 108. In one embodiment, the route ranking system 202 determines the call information from the call.

At block 504, the route ranking system 202 identifies the call type. The call type can include any predefined type of call identified by the communications carrier system 108. In one embodiment, identifying the call type can include, for example: identifying if the call origin and/or the call destination is international; identifying if the call is interstate; identifying if the call is intrastate; identifying if the call is a fax call; identifying if the call is a modem call; identifying if the call is a toll-free call; and identifying if the call is a premium-rate call, to name a few.

At decision block 506, the route ranking system 202 determines if the call type is associated with a restricted call type. The restricted call type can include any type of call that the communications carrier organization may choose not to process (e.g. international calls or fax calls). If so, the route ranking system 202 rejects the call at block 508. In one embodiment, rejecting the call can include providing an error message to one or more of the session border controller 120, the communications carrier system 108, the customer, or an administrator associated with the route ranking system 202 and/or the communications carrier system 108.

If the call type is not associated with a restricted call type, the route ranking system 202 determines if a customer rate associated with the customer and the call destination exists at decision block 510. In one embodiment, determining if a customer rate exists can include accessing a customer rate from the customer rate table store 254 associated with the customer and the call destination. In one embodiment, the rate table provider system 250 determines if the customer rate exists, and, if so, provides the customer rate to the route ranking system 202. In one embodiment, if a customer rate associated with the customer and call destination does not exist, a default customer rate associated with the customer, if one exists, is provided to the route ranking system 202.

If a customer rate associated with the customer and the call destination does not exist, the route ranking system 202 rejects the call at block 508. In one embodiment, the route ranking system 202 rejects the call at block 508 if neither a customer rate associated with the customer and the call destination nor a default rate associated with the customer exists.

If a customer rate associated with the customer and the call destination exists, the route ranking system 202 accesses the customer rate at block 512. In one embodiment, accessing the customer rate includes providing the customer rate to one or more vendor ranking modules 204.

At block 514, the route ranking system 202 identifies a set of vendors associated with the call destination. At block 516, the route ranking system 202 determines vendor rates associated with the set of vendors. In one embodiment, the route ranking system 202 uses the rate table provider system 250 to identify the set of vendors associated with the call destination and/or the vendor rates associated with the set of vendors.

At block 518, a set of vendor determination factors associated with the call are identified. In one embodiment, identifying a set of vendor determination factors can include accessing a set of preferences associated with one or more of the customer, the call type, and the call destination. These preferences can be accessed directly from the customer preferences repository 232, or can be accessed via the customer preferences system 230. In one embodiment, the preferences identify a subset of vendor determination factors to apply in determining the ranked order routing list. In one embodiment, the preferences identify a set or subset of vendor ranking modules 204 to use to facilitate determining the ranked order routing list.

At block 520, predetermined weights are applied to the set of vendor determination factors. In one embodiment, an administrator, associated with the route ranking system 202 and/or the communications carrier system 108, specifies the predetermined weights. In one embodiment, each vendor determination factor is weighted equally. Alternatively, the vendor determination factors may have varying weights. In one embodiment, the customer specifies the predetermined weights. In one embodiment, the administrator can limit the predetermined weights that the customer can specify. For example, the administrator may require that the determination of the margin module 212 is weighted 70% and may allow the customer to apply the remaining 30% weight to the vendor determination factors in any combination that the customer selects. The customer may, for example, specify that an additional 10% weight be applied to the determination of the margin module 212 and that the remaining 20% weight be applied to the determination of the cash flow module 218.

In one embodiment, the predetermined weights are stored at the customer preferences repository 232. In one embodiment, the customer preferences system 230 can access and provide the predetermined weights to, for example, the module weight attribution system 208.

At block 522, a ranked order routing list is determined based on one or more of the customer rate, the vendor rates, and the weighted set of vendor determination factors. In one embodiment, the ranked order routing list is determined based on ranked routes determined by the vendor ranking modules 204 associated with the vendor determination factors. In one embodiment, the ranked order routing list can specify one or more of: vendors; communication ports associated with specific vendors; and specific routes associated with specific vendors. In one embodiment, the ranked order routing list can include every possible route that can be used to complete the call. Alternatively, the ranked order routing list can include a predetermined number of routes that can be used to complete the call. For example, the ranked order routing list can be limited to three routes or to five routes.

At block 524, the ranked order routing list is provided to a session border controller, such as the session border controller 120. In one embodiment, the ranked order routing list is provided to the session border controller that provided the call information at block 502 to the route ranking system 202. Alternatively, the ranked order routing list is provided to a traffic burst protection system that provided the call information at block 502 to the route ranking system 202. In one embodiment, the ranked order routing list is provided to a session border controller that is determined to be the next session border controller scheduled to process the call for routing. Alternatively, the ranked order routing list is provided to a session border controller identified as having enough capacity to process the call for routing. In embodiments where the ingress session border controller and the egress session border controller may differ, the egress session border controller can access the call and/or call information associated with the call from the ingress session border controller and/or the route ranking system.

Dynamic Routing Determination

Figure 6:
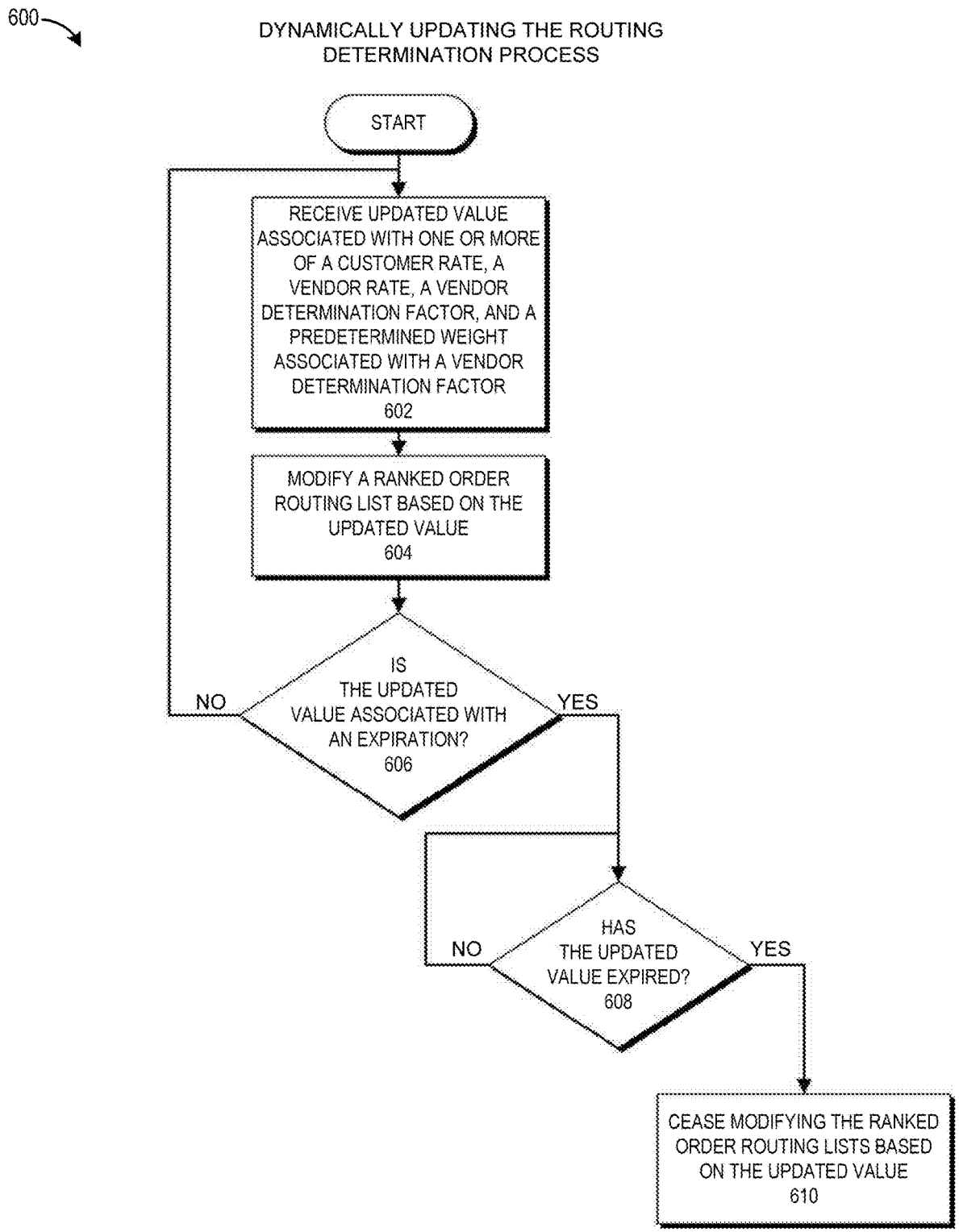
FIG. 6 illustrates a flow diagram for one embodiment of a process for dynamically updating a routing determination process in accordance with the teachings of the present disclosure.

FIG. 6 illustrates a flow diagram for one embodiment of a process 600 for dynamically updating a routing determination process in accordance with the teachings of the present disclosure. Process 600, in some embodiments, advantageously enables updates to criteria or factors for determining call routing without loading new customer rate tables, vendor rate tables, or any other routing criteria tables. The process 600 can be performed by any system capable of determining a priority order of routes based on one or more predefined criteria or factors for routing a call. In one embodiment, process 600 can be performed by route ranking system 202.

The process begins at block 602 when, for example, the route ranking system 202 receives an updated value associated with one or more of a customer rate, a vendor rate, a vendor determination factor, and a predetermined weight associated with a vendor determination factor. The updated value can be a new value, or a modification associated with an existing value. For example, the updated value can be a 2-cent vendor rate that is intended to replace a 4-cent vendor rate associated with vendor "X" and Local Access and Transport Area (LATA) 730. As a second example, the updated value can be a 1-cent increment modifier that is intended to increment all vendor rates, or a specified subset of vendor rates, associated with vendor "Y" by 1 cent.

At block 604, a ranked order routing list is modified based, at least in part, on the updated value. In one embodiment, one or more vendor ranking modules 204 are modified based, at least in part, on the updated value. Modifying the one or more vendor ranking modules 204 can include modifying the determinations made by the vendor ranking modules 204 based, at least in part, on the updated value. In one embodiment, the module weight attribution system 208 can adjust the weights applied to the determinations of the vendor ranking modules 204 based, at least in part, on the updated value.

At decision block 606, the route ranking system 202 determines if the updated value is associated with an expiration. In one embodiment, the expiration can be based on any event or condition including time, usage, or a predefined event, to name a few. For example, in the case of a time-based expiration, the updated 4-cent vendor rate described above could expire in 2-days or on Jul. 2, 2011. As another example, in the case of a usage-based expiration, the updated 4-cent vendor rate described above could expire after $1,000 worth of calls are routed to LATA 730 via vendor X. As another example, in the case of an event-based expiration, the updated 4-cent vendor rate described above could expire upon new tables being loaded into vendor rate table store 252, or upon signing a new contract with vendor X.

If the updated value is not associated with an expiration, the route ranking system 202 can use the updated value until the updated value is modified or replaced. If the updated value is associated with an expiration, it is determined at decision block 608 whether the updated value has expired. If so, at block 610, modification of ranked order routing lists based, at least in part, on the updated value ceases. In one embodiment, ceasing modification of the ranked order routing lists can include restoring one or more vendor ranking modules 204 to the previous settings associated with the one or more vendor ranking modules 204. For example, the updated 4-cent vendor rate described above may be restored to the 2-cent vendor rate. In one embodiment, restoring the previous settings includes removing the updated value from the vendor ranking modules 204. For example, the updated 4-cent vendor rate may be removed from the vendor ranking modules 204. In this example, if the margin module 212 attempts to calculate a margin associated with vendor X, the margin module 212 would access the vendor rate stored in the vendor rate tables 253, which may be the old 2-cent rate, or a new rate stored in the vendor rate tables 253. In one embodiment, if the updated value has expired, the module weight attribution system 208 is restored to its previous settings.

Local Number Portability

Figure 7:
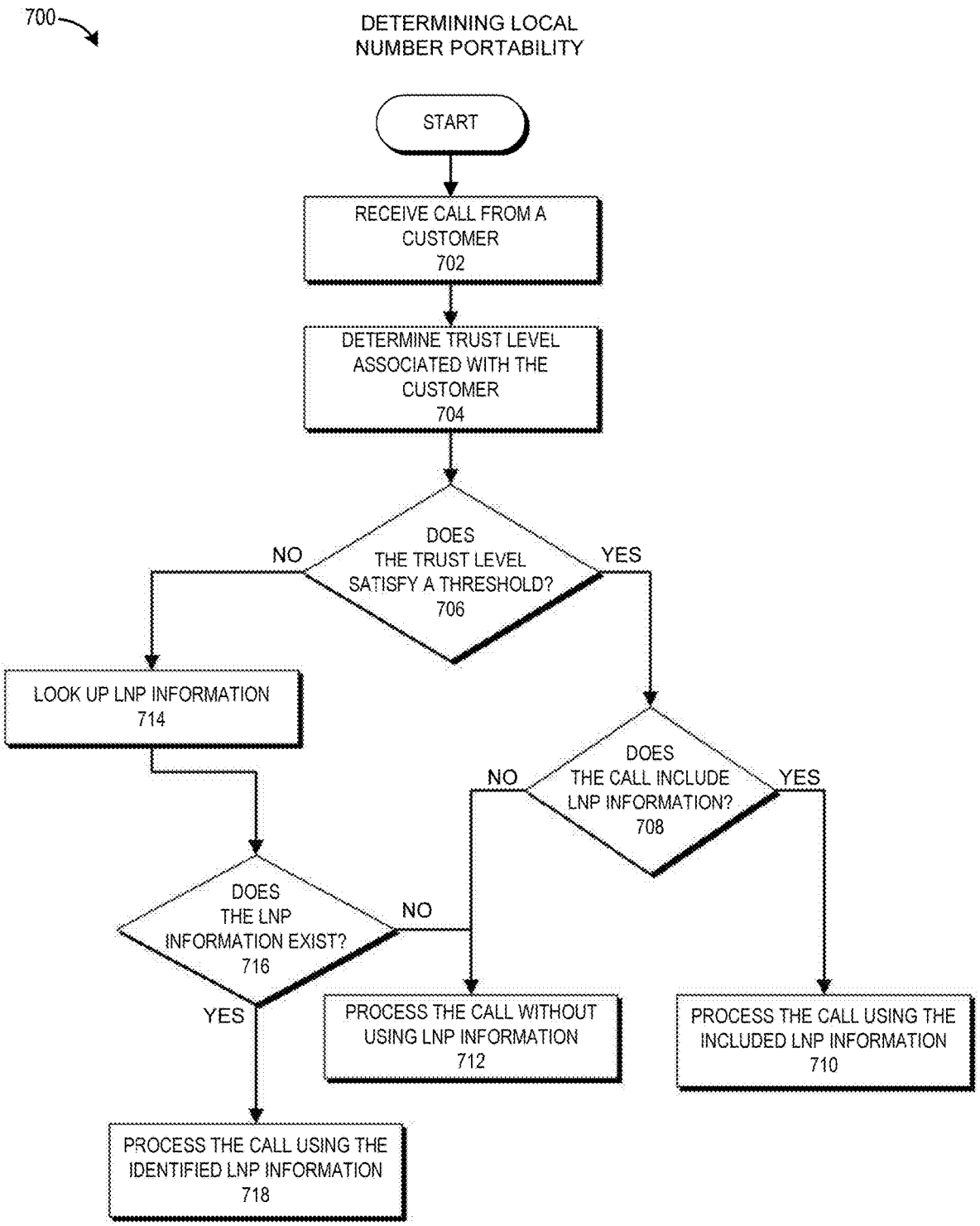
FIG. 7 illustrates a flow diagram for one embodiment of a process for determining local number portability information in accordance with the teachings of the present disclosure.

FIG. 7 illustrates a flow diagram for one embodiment of a process 700 for determining local number portability (LNP) information in accordance with the teachings of the present disclosure. The process 700 can be performed by any system capable of routing a call including a communications carrier system 106 that initially received a call from the origin caller 102, a communications carrier system 106 that completed the final call connection to the destination caller 104, or a communications carrier system somewhere in between. In one embodiment, a session border controller (e.g. the session border controller 120) associated with the communications carrier system can perform the process 700. Alternatively, a route ranking system (e.g. the route ranking system 202) associated with the communications carrier system can perform the process 700. To simplify discussion, the process 700 will be described generally in terms of the communications carrier system 108.

The process begins at block 702 when, for example, the communications carrier system 108 receives a call from a customer system, such as a communications carrier system 106. This call can include call information associated with the call. At block 704, the communications carrier system 108 determines a trust level for the customer associated with the customer system. The trust level can be based on any number of trust factors. For example, the trust level can be based on whether the customer is a new customer, whether the customer has a history of providing accurate LNP information, the size of the customer, and/or various other factors. The size of the customer may be based, at least in part, on the number of employees of the customer, the geographic area serviced by the customer, the revenue earned in a given time period, the number of calls processed in a given time period, the number of clients that the customer supports, the number of calls provided to the communications carrier system 108 in a given time period, or any other factor for evaluating the size of an organization.

One or more of the trust factors may be specified by an administrator or may be determined automatically by the communications carrier system 108. The communications carrier system 108 may determine the trust factors by accessing information associated with the customer at a customer repository (not shown) associated with the communications carrier system 108. Further, the communications carrier system 108 may determine whether the customer has a history of providing accurate LNP information by determining if the price margin for processing for processing a call matches an expected price margin. For example, suppose that the customer provides the communications carrier system 108 with LNP information for processing a call further suppose that the communications carrier system 108 determines that the expected margin for processing the call is 5-cents. If the actual margin results in a loss of 10-cents, the communications carrier system 108 may determine that the provided LNP information was inaccurate or outdated. As a result, the communications carrier system 108 may lower the trust level associated with the customer. Alternatively, the communications carrier system 108 may raise or lower the trust level based on how often the expected margin for processing a call matches the actual margin. The customer's trust level may be stored at the customer repository. Further, the communications carrier system 108 may store at the customer repository the customer's history of providing accurate or inaccurate LNP information to facilitate determining the trust level.

At decision block 706, the communications carrier system 108 determines whether the trust level satisfies a threshold. This threshold can be pre-defined by an administrator of the communications carrier system 108. Further, the threshold may vary based on the call and/or how recently the communications carrier system 108 received updated LNP information. For instance, the threshold may differ if the communications carrier system 108 accessed the number portability data repository 142 the morning of the call versus if the communications carrier system 108 has not accessed the number portability data store 142 in a month. The change in threshold may be initiated by the administrator, or the communications carrier system 108 may automatically adjust the threshold in response to a trigger, such as the elapse of a period of time since the last number portability data repository 142 access. Further, the communications carrier system 108 could select the threshold dynamically at the time of the call.

If the trust level does not satisfy a threshold, the communications carrier system 108 looks up the LNP information for the number associated with the destination caller 104 at block 714. In one embodiment, the LNP information may be associated with the number of the origin caller 102 associated with the received call. The communications carrier system 108 can look up the LNP information by accessing LNP information from the number portability data store 142 via the number portability data provider system 140. Alternatively, if the communications carrier system 108 has previously accessed LNP information from, for example, the number portability data repository 142, then the communications carrier system 108 may access a local data store to look up the LNP information.

At decision block 716, the communications carrier system 108 determines if the LNP information exists for the number associated with the destination caller 104. If so, the communications carrier system 108 processes the call using the identified LNP information at block 718. Processing the call with the LNP information can include performing one or more of the process 300 and the process 500 using call information associated with the call and the identified LNP information. Advantageously, in some embodiments, by processing the call with the LNP information, the cost of routing the call may be reduced by selecting a cheaper vendor based at least in part on the ported number. If the LNP information does not exist, the communications carrier system 108 processes the call without using LNP information.

If, at decision block 706, the communications carrier system 108 determines that the trust level satisfies a threshold, the communications carrier system 108 determines at decision block 708 whether the call information associated with the call includes LNP information. If so, the communications carrier system 108 processes the call using the included LNP information. Advantageously, in some embodiments, processing the call with the included LNP information can reduce the cost of processing the call because, for example, resources (e.g. money, time, and/or computing resources) expended in attempting to access the LNP information from a third-party provider (e.g. the number portability data provider system 140) can be reduced.

If the call does not include the LNP information, the communications carrier system 108 processes the call at block 712 without using LNP information. In some embodiments, because the trust level associated with the customer satisfies the threshold, if the call does not include LNP information it is presumed that the number has not been ported and therefore, no LNP information exists. Advantageously, in some embodiments, not looking up LNP information for calls associated with trusted customers reduces the resources expended in processing the call.

In some embodiments, the communications carrier system 108 may determine whether to look up the LNP information based on expected call traffic. For example, if a customer contractually or historically provides only landline call traffic to California, the communications carrier system 108 may forego looking up LNP information.

The following examples illustrate how the process of FIG. 7 may be used to process calls. In one example, the communications carrier system 108 may receive a call from a customer that has a history of providing accurate LNP information to the communications carrier system 108 (block 702). The communications carrier system 108 can determine, based on the customer's history of providing accurate LNP information, that the customer has a trust level that satisfies a trust threshold (block 706). Based on this determination, the communications carrier system 108 can use the customer-supplied LNP information, if any, to process the call (block 710) without performing an LNP look-up operation. As a second example, if the customer did not supply any LNP information, the communications carrier system 108 can process the call without using LNP information (block 712) under the assumption that LNP information does not exist for the call. In another example, if the communications carrier system 108 determines that the customer does not have a history of providing accurate LNP information, either because the customer has supplied inaccurate LNP information or because the customer is new, the customer communications system 108 will look up the LNP information (block 714) regardless of whether the customer provided LNP information.

Example Rate Table Update Process

Figure 8:
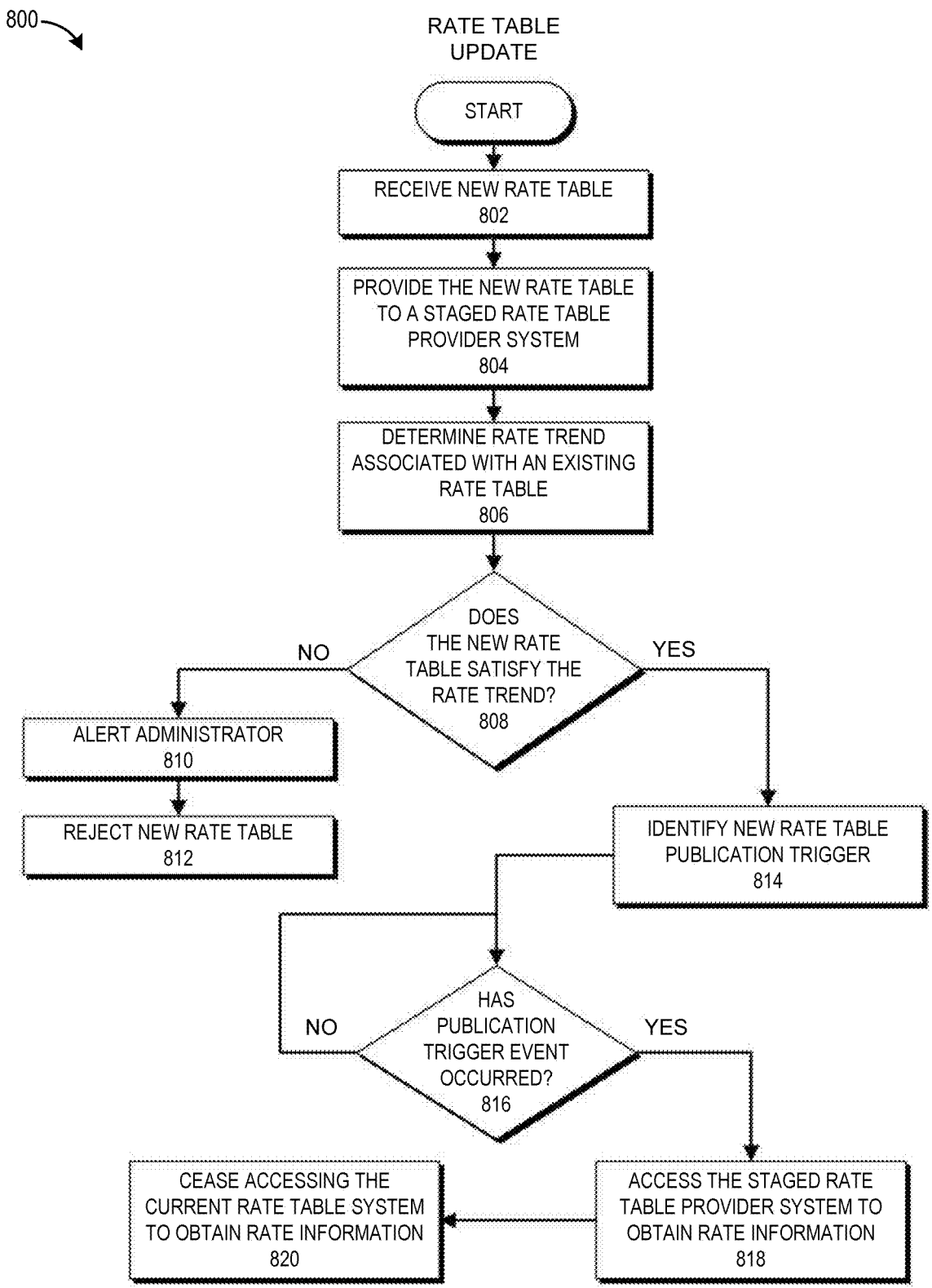
FIG. 8 illustrates a flow diagram for one embodiment of a process for updating a rate table in accordance with the teachings of the present disclosure.

FIG. 8 illustrates a flow diagram for one embodiment of a process 800 for updating a rate table in accordance with the teachings of the present disclosure. The process 800 can be performed by any system that maintains one or more rate tables for determining the cost to route a call. For example, the process 800 can be performed, at least in part, by a communications carrier system 106 that initially received a call from the origin caller 102, a communications carrier system 106 that completed the final call connection to the destination caller 104, or a communications carrier system somewhere in between. In one embodiment, a session border controller (e.g. the session border controller 120) associated with the communications carrier system can perform the process 800. Alternatively, a route ranking system (e.g. the route ranking system 202) associated with the communications carrier system can perform the process 700. To simplify discussion, the process 800 will be described generally in terms of the communications carrier system 108.

The process begins at block 802 when, for example, the communications carrier system 108 receives a new rate table. The new rate table can be received from an administrator of the communications carrier system 108 or any other system or user authorized to provide new rate tables to the communications carrier system 108. For example, the new rate table may be provided by a vendor associated with the communications carrier system 108. At block 804, the communications carrier system 108 provides the new rate table to a staged rate table provider system (e.g. staged rate table provider system 260). Providing the new rate table to the staged rate table provider system can include storing the new rate table in one of the staged rate table repositories. For instance, if the new rate table includes a vendor rate table, the new rate table can be stored on the staged vendor rate table repository 262 and if the new rate table includes a customer rate table, the new rate table can be stored on the staged customer rate table repository 264. Although described in the singular, it is possible for the new rate table to include multiple rate tables. Further, the new rate table may include vendor rate tables, customer rate tables, or both. In addition, the new rate table may include new rates for each entry in the existing rate table, or may include new rates for the entries in the existing rate table that are to be updated.

At block 806, the communications carrier system 108 determines a rate trend associated with an existing rate table. Determining the rate trend may include accessing one or more existing rate tables from the rate table repositories (e.g. vendor rate table repository 252 and/or customer rate table store 254). Further, determining the rate trend may include accessing one or more historical rate tables from the historical rate table repository 256. The historical rate tables may include vendor rate tables and customer rate tables previously used by the communications carrier system 108 or the route ranking system 202 to determine the margins on routing calls. Further, the historical rate tables may include a table of previously calculated rate trends associated with previous rate tables and/or existing rate tables. The rate trends may include any information relating to rate values over a period of time. For example, this information may identify, for a given period of time, whether rates have changed, how much rates have changed, at what pace rates have changed, whether rates have increased, decreased, or remained static, and whether rates that have changed remained centered around a given value, to name a few. The communications carrier system 108 may calculate the rate trend for a given period of time. Thus, the rate trend may be for the lifetime of the communications carrier system 108, or may be associated with a specific time period, such as the most recent year. Alternatively, the rate trend may be associated with a predefined number of rate table updates. For example, the rate trend may be based on the past five rate table updates.

At decision block 808, the communications carrier system 108 determines whether the new rate table satisfies the rate trend. This determination can include identifying whether the difference between the new rates and existing and/or historical rates satisfies a threshold. The threshold can be specified by an administrator associated with the communications carrier system 108, an administrator associated with a vendor who may have provided the rate table, or can be automatically determined based on any number of factors, such as a revenue goal for the communications carrier system 108 or associated organization. Further, a separate threshold can be used for rate increases and for rate decreases.

In some embodiments, determining whether the rate table satisfies the rate trend can include determining whether the new rates match the historical direction of the rate changes. For example, if rates have historically been increasing over a period of time, the communications carrier system 108 may determine whether the new rate satisfies the trend by determining whether the new rate is an increase over the existing rates. Alternatively, or additionally, determining whether the new rate table satisfies the rate trend may include determining whether the magnitude or the degree of change between the new rate and the existing rate is within a variance threshold. Further, the variance threshold may differ for rate increases and rate decreases. For example, a rate decrease of 2% may satisfy a rate decrease variance threshold, but a rate increase of 2% may not satisfy a rate increase variance threshold. The variance thresholds may be specified by an administrator, or may be determined from historical rate changes over a period of time (e.g. three months, five years, or the operational lifetime of the communications carrier system 108). For example, if rates for a customer, or for a LATA, have not varied by more than 3-cents per rate change over a pre-specified period of time, the communications carrier system 108 may set the variance threshold to 3-cents. Alternatively, the communications carrier system 108 may set the variance threshold to 3-cents +/−a tolerance factor (e.g. 1-cent) to account for a rate change that does not match the historical trend, but is within an acceptable tolerance for the organization associated with the communications carrier system 108. This tolerance factor may be specified by an administrator.

In some embodiments, the communications carrier system 108 may determine if each rate or groups of rates from the new rate table satisfies an associated rate trend. Both the rate trends and the determinations can be grouped by any factor. For example, the rates may be grouped by vendor, customer, a LATA, or a geographic location, to name a few. Alternatively, the communications carrier system 108 may determine if the existing rate table as a whole satisfies the rate trend.

If the new rate table, in part or as a whole, does not satisfy the rate trend, the communications carrier system 108 can cause an administrator to be alerted at block 810. This can include any method for alerting an administrator including visual alerts, auditory alerts, or both. For example, the alert can be an email, a text message, a flashing image or text on a computer screen associated with the communications carrier system 108, a beep, or a voice mail to name a few. In one embodiment, block 810 is optional.

At block 812, the communications carrier system 108 rejects the new rate table. Rejecting the new rate table can include removing the new rate table from the staged rate table provider system. Alternatively, the communications carrier system 108 may not provide the new rate table to the staged rate table provider systems until and/or unless the communications carrier system 108 determines that the new rate table satisfies the rate trend. In one embodiment, an administrator associated with the communications carrier system 108 can override the alert and cause the new rate table to be accepted despite the communications carrier system 108 determining that the new rate table does not satisfy the rate trend. Advantageously, in some embodiments, the ability to override the rejection of the new rate table enables the use of rate tables that are error free, but do not satisfy the rate trend. For example, a change in telecommunications-related tax law might result in a trend of declining prices suddenly reversing, or vice versa.

If, at decision block 808, the communications carrier system 108 determines that the new rate table does satisfy the rate trend, the communications carrier system 108 identifies a new rate table publication trigger at block 814. The new rate table publication trigger can include any event that indicates the new rate table should be used as the current rate table for calculating margins or identifying the cost for processing a call. For example, the trigger can include: a click of a button by an administrator, the passage of time, a number of calls processed, or a change in the rate of received or processed calls, to name a few. Further, the trigger may be specified by an administrator associated the communications carrier system 108 or a third party that provided the new rate table to the communications carrier system 108 (e.g. the vendor who provided the new vendor rate table). In some embodiments, the trigger may be the communications carrier system 108 receiving the new rate table.

At decision block 816, the communications carrier system 108 determines whether the publication trigger event has occurred. If so, at block 818, the communications carrier system 108 accesses the staged rate table provider system (e.g. the staged rate table provider system 260) to obtain rate information for call processing. At block 820, the communications carrier system 108 ceases accessing the rate table provider system 250 to obtain rate information for call processing. In some embodiments, the communications carrier system 108 performs blocks 818 and 820 substantially in parallel. Further, blocks 818 and 820 can be performed by switching the identity or role of the active rate table provider system and the staged rate table provider system. The process 800 can generally be repeated each time a new rate table is received. Therefore, in some embodiments, the staged rate table system 260 and the rate table provider system 250 can alternate roles with each newly received new rate table.

The process 800 can be used to load and process new rate tables in advance of when the new rate tables are scheduled to become effective because, in some embodiments, the communications carrier system 108 can load and process new rate tables in the staged rate table provider system 260 while the rate table provider system 250 is the active rate table provider system. Similarly, when the rate table provider system 260 becomes the active rate table provider system, the communications carrier system 108 can load and process new rate tables in the rate table provider system 250. Advantageously, in some embodiments, by preloading and processing rate tables, the communications carrier system 108 can update rate tables with little or no cessation of call processing.

The following examples illustrate how the process of FIG. 8 may be used to process calls. In one example, the communications carrier system 108 may receive a new rate table from a vendor or an administrator associated with the communications carrier system 108 (block 802). The new rate table may be associated with a particular customer, vendor, or LATA. The communications carrier system 108 determines that the new rate table satisfies the rate trend associated with corresponding existing rate tables (block 808). The communications carrier system 108 stores the new rate table in a staged rate table provider system until the new rate table is scheduled to publish. The communications carrier system 108 may identify a trigger event indicating when to publish the new rate table (block 814). When the trigger event occurs, the communications carrier system 108 publishes the new rate table. Publishing the new rate table includes the communications carrier system 108 using the new rate table to facilitate determining call routes and processing calls (block 818). Further, publishing the new rate table may include the communications carrier system 108 ceasing use of a pre-existing corresponding rate table (block 820). In other words, when the trigger event occurs, the communications carrier system 108 may stop using an older rate table and being using a newer rate table to process calls. In another example, the new rate table does not satisfy a rate trend. In this example, the communications carrier system 108 may alert an administrator and will not schedule the new rate table to publish (blocks 810 and 812).

Example Communications Environments Including a Communications Exchange System

Figure 9A:
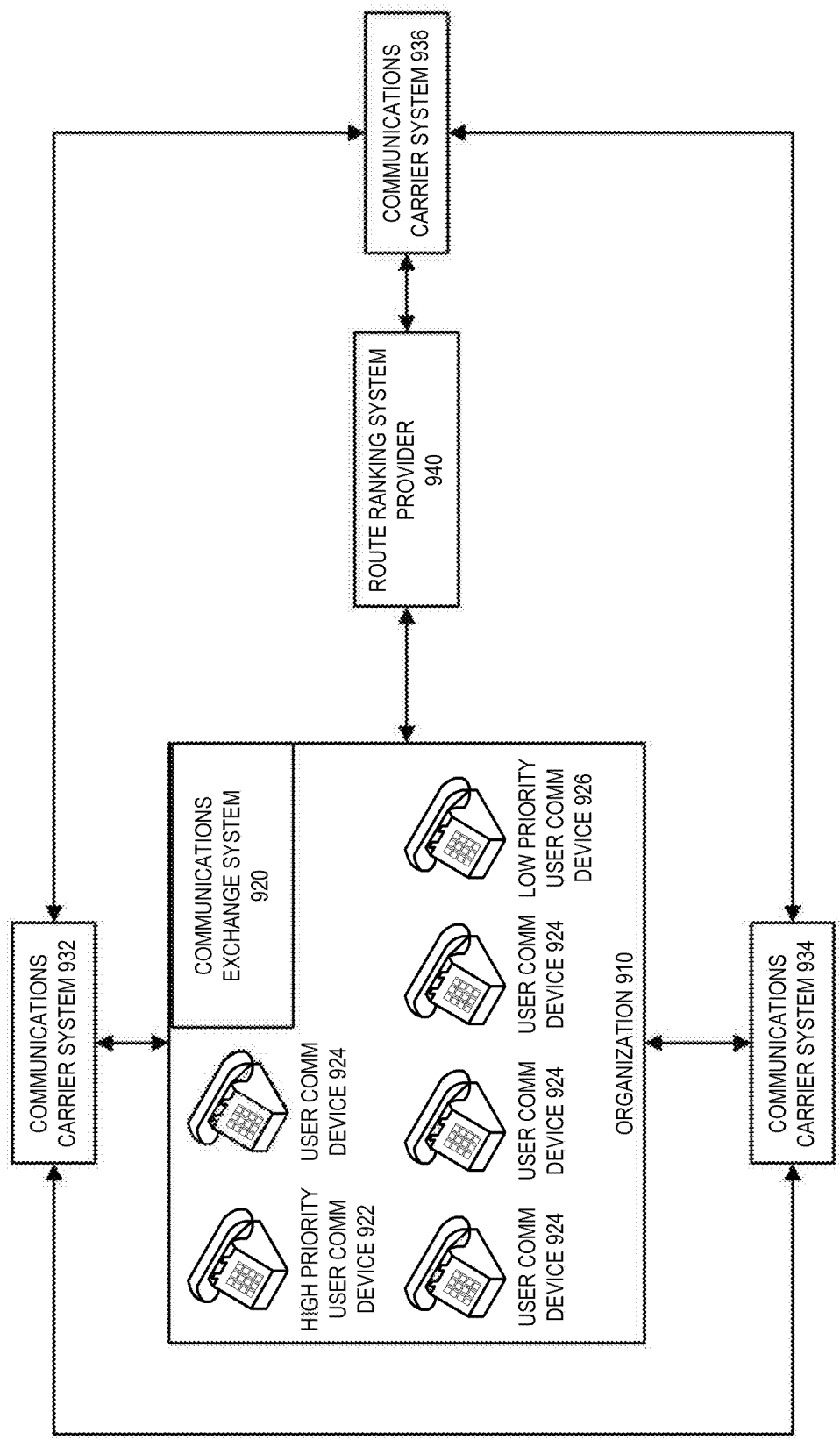
FIGS. 9A-B illustrate embodiments of a communications environment including a communications exchange system associated with an organization in accordance with the teachings of the present disclosure.
Figure 9B:
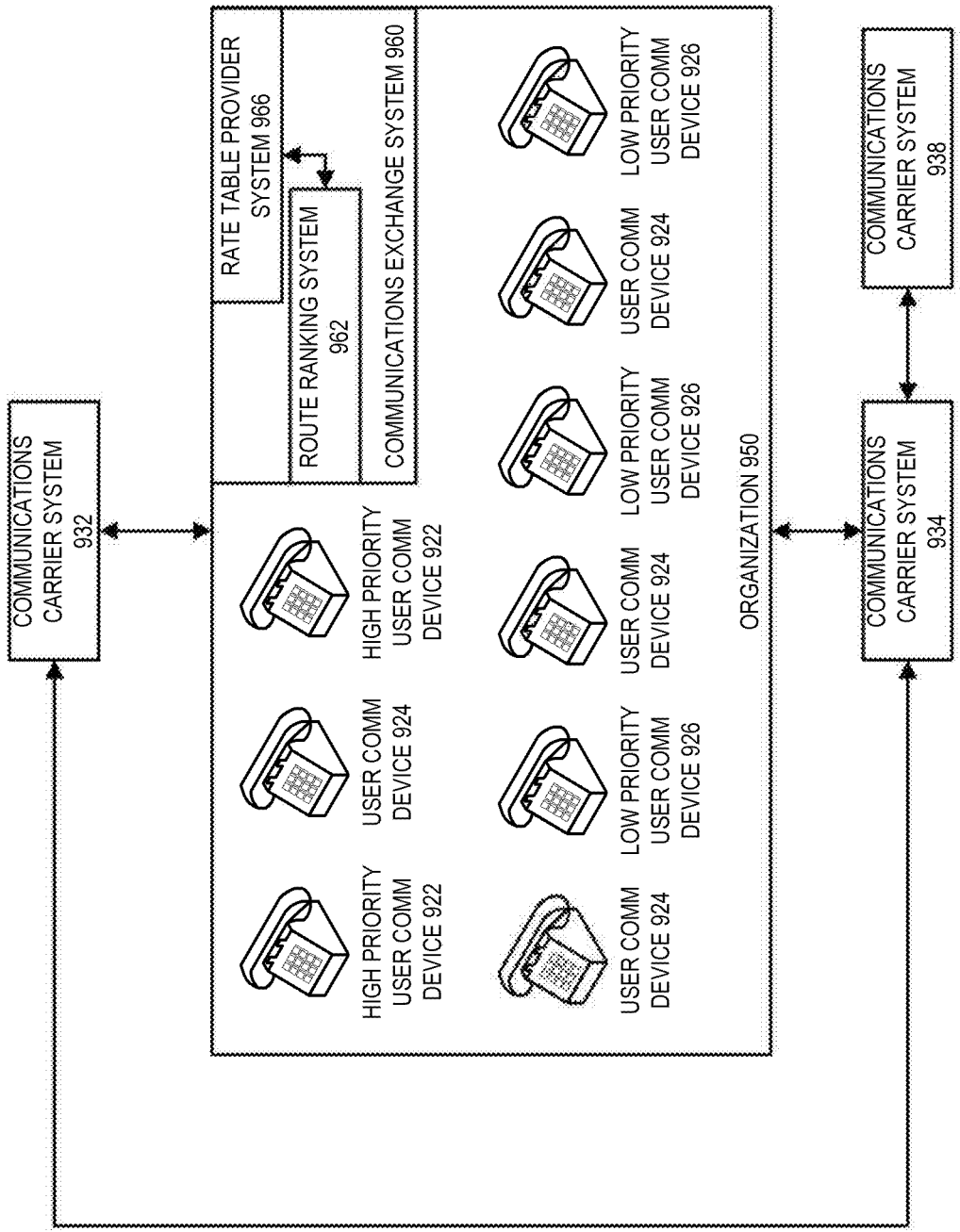

FIGS. 9A-B illustrate embodiments of a communications environment including a communications exchange system associated with an organization in accordance with the teachings of the present disclosure. FIG. 9A illustrates an organization 910 that includes a communications exchange system 920. The communications exchange system 920 can include any system that facilitates the processing of inbound and outbound calls to and from the organization 910. Further, the communications exchange system 920 is capable of providing calls originating from phones or communication devices associated with the organization 910 (e.g. user communication devices 924, high priority user communication devices 922, and low priority user communication devices 926) to one or more communications carrier systems or organizations (e.g. communications carrier system 932 and communications carrier system 934) to complete the call connection with the target of the call (not shown). Similarly, the communications exchange system 920 is capable of receiving calls from one or more communications carrier systems and redirecting the calls to the organization's 910 phones.

In addition to the above-described capabilities, the communications exchange system 920 is capable of communicating with a route ranking system provider 940. The route ranking system provider 940 can generally include any provider system that includes a route ranking system (e.g. route ranking system 202) or that can provide some or all of the capabilities of a route ranking system as described above. The communications exchange system 920 can provide call information associated with a call to the route ranking system provider 940 and, in response, receive an identification of one or more communications carrier systems in a ranked list of communications carrier systems that can process the call. The ranking order of the communications carrier systems in the ranked list can be based on any criteria provided by the communications exchange system 920. For example, the criteria can include, price, reliability, or billing cycle, to name a few. Further, the ranked list can be based on the call information provided by the communications exchange system 920. As previously described, the call information can include any information associated with the call including, for example, the identity of the organization 910, the destination number, the destination geographic location, or whether the call is a fax call, to name a few. In addition, the ranked list can be based on the communications carrier organizations with which the organization 910 maintains an active account. Thus, for example, if the organization 910 does not have an account with the organization associated with the communications carrier system 936, as illustrated by the lack of connection between the organization 910 and the communications carrier system 936 in FIG. 9A, the ranked list may not include the communications carrier system 936.

The communications exchange system 920 can communicate with the route ranking system provider 940 directly, or via a network (not shown). For example, the communications exchange system 920 may have a dedicated connection to the route ranking system provider 940, may communicate via a communications network associated with the route ranking system provider 940, or may communicate with the route ranking system provider 940 via the Internet.

In the illustrated embodiment, the organization 910 may maintain an account with the route ranking system provider 940. Thus, the organization 910 may associate the criteria used for determining the ranked list with the account. Alternatively, or additionally if, for example, the criteria differs for a particular call, the communications exchange system 920 can provide the criteria to the route ranking system provider 940 as part of the call information associated with the call. Further, the organization 910 may have multiple profiles associated with its route ranking system provider 940 account. Having multiple profiles enables the organization to pre-specify different criteria for the high priority user communication device 922, the user communication device 924, and the low priority user communication device 926. Alternatively, the profiles may be associated with users of the communication devices instead of or in addition to associating the profiles with the communication devices.

The criteria used for establishing the ranked list of communications carrier systems may differ based on the call, the caller, or the communications device. For example, the criteria for a user communication device 924, or for a user associated with the user communication device 924, may include, inter alia, cheapest communications carrier system or organization for processing the call. The criteria for a low priority user communication device 926, or for a user associated with the low priority communication device 926, may, for example, be based solely on cheapest communications carrier system or organization for processing the call. Moreover, for example, the criteria for a high priority user communication device 922, or for a high priority user associated with the high priority communication device 922, may not include cost at all, but may be based on call clarity and/or call reliability.

The communications exchange system 920 may determine the priority of the outbound call (e.g. high priority user or low priority user) based on the phone number or communication device of the originating caller. Alternatively, the priority may be determined by identifying the caller based on, for example, a pin code or voice identification. Advantageously, in some embodiments, by identifying the caller, the communications exchange system 920 can provide or identity communications carrier ranking criteria to the route ranking system provider 940 specific to the caller instead of the communication device. This enables criteria associated with, for example, a high priority user to be used to obtain the ranked list of communications carrier systems or organizations even when the high priority user makes a call from a low priority user's communications device.

The communications carrier systems 932, 934, and 936 can include any systems capable of processing calls. Further, the communications carrier systems 932, 934, and 936 can include communications networks (not shown) that enable the completion of the call connection between users associated with the organization 910 and other users or organizations. Each of the communication carrier systems may or may not include the various route ranking capabilities described above with respect to the route ranking systems. As illustrated in FIG. 9A, the communications carrier systems 932 and 934, and associated communication carrier organizations, are currently call service providers for the organization 910 and its associated users. The organizations associated with the communications carrier systems 932 and 934 may each provide different rates and services for the organization 910. Further, the rates and services may differ based on the call. Communications carrier system 936 represents a communications carrier system that may or may not be capable of providing call services to the organization 910. However, as illustrated in FIG. 9A, the communications carrier system 936 does not currently provide service to the organization 910. Each of the communications carrier systems 932, 934, and 936 are capable of communicating with each other and may serve as both customers and vendors to facilitate the processing of calls. For example, if the organization 910 uses the communications carrier system 932 to process a call, the communications carrier system 932 may in turn use one or both of the communications carrier systems 934 and 936 to help complete the call for the organization 910. Although the communications carrier systems 932, 934, and 936 are depicted as each being able to communicate with the other communications carrier systems, it is also possible that one or more of the communications carrier systems may not be able to communicate directly with one or more of the remaining communication carrier systems. For example, the communications carrier system 938 illustrated in FIG. 9B, can communicate with the communications carrier system 934, but may not communicate directly with the communications carrier system 932.

In some embodiments, the communications carrier systems may include route ranking systems. Alternatively, the communications carrier systems may use a route ranking system provider to facilitate call processing. For example, as depicted in FIG. 9A, the communications carrier system 936, or associated organization, may have an account with the route ranking system provider 940 thereby enabling the communications carrier system 936 to obtain a ranked list of communication carrier systems that can help the communications carrier system 936 complete a call it is processing for a customer.

The organization 910 represents any organization that may own, lease or use a communications exchange system 920. Further, the organization 910 may include one or more communication devices (e.g. user communications device 924) for making calls via a communications carrier system or associated organization. These communication devices may include any type of device for initiating or receiving a voice or data call including, analog phones, digital phones, VoIP capable phones, fax machines, computing devices, or any other communications device capable of making a call using, directly or indirectly, a communications carrier system, such as the communications carrier system 932. Further, the communications devices are capable of communicating with the communications exchange system 920. The organization 910 may generally include any commercial, industrial, governmental, or other such organization that may include a number of communications devices and users. Further, it is possible for the organization to represent an individual home or a plurality of residences (e.g. an apartment building), which can use the communications exchange system 920.

User communication devices 924, high priority user communication devices 922, and low priority user communication devices 926 represent communications devices (e.g. phones) associated with users who may be associated with different call priorities (e.g. normal, high, and low). Although FIG. 9A illustrates three call priorities, there is no limit to the number of call priorities. For example, there could be one, five, or ten different call priorities. Each of the call priorities may be associated with different criteria used by the route ranking system provider 940 to determine the ranking order of communications carrier systems for processing a call as described above. Further, the call priorities may be associated with the users making the calls rather than the communications devices. Alternatively, the call priorities may be associated with the communications device.

The call priority may be determined by any factor specific to the organization 910. For example, the call priority may be based on an employee's seniority (e.g. time or position) within the organization. Alternatively, call priority may be based on the employee's role within the organization. For example, an employee (e.g. a sales person) whose job may require making a high volume of important calls, as defined by the organization, may be associated with the high priority user communication device 922. In contrast, an employee, who may be more senior or less senior than the salesman, but whose job may not require extensive phone use (e.g. a production manager or a member of the support staff) may be associated with a user communication device 924 or a low priority user communication device 926.

FIG. 9B illustrates an organization 950 that includes a communications exchange system 960. The organization 950 can represent any organization that may own, lease or use the communications exchange system 960. The communications exchange system 960 can include any system that can facilitate processing inbound and outbound calls to and from the organization 950. Further, the communications exchange system 960 can determine which communications carrier system, or associated organization, to use to process an outbound call based on any criteria associated with the call, and/or the caller or communications device (e.g. high priority user 926).

The communications exchange system 960 can include a route ranking system 962 and a rate table provider system 966. The communications exchange system 960 can use the route ranking system 962 to obtain a ranked list of communications carrier systems capable of processing an outbound call. The route ranking system 962 can include some or all of the capabilities as described above with respect to the route ranking systems (e.g. route ranking system 202).

The communications exchange system 960 can maintain different profiles associated with different users. The profiles can be associated with individual users or may be associated with user classifications (e.g. high priority or low priority user). These profiles, similar to those described with respect to FIG. 9A, are used by the route ranking system 962 to facilitate creating the ranked list of communications carrier systems for an outbound call.

To facilitate generating the ranked list of communications carrier systems, the route ranking system 962 can access from, for example, the rate table provider system 966, rates associated with the communications carrier systems or organizations associated with the communications carrier systems for processing a call. The rate table provider system 966 can generally include some or all of the capabilities as described above with respect to the rate table provider systems (e.g. rate table provider system 250). Further, the rate table provider system 966 may include multiple rate table provider systems. For example, the rate table provider system 966 may include a staged rate table provider system thereby enabling the use of a staged rate table update process for updating rate tables, such as described with respect to FIG. 8.

In one embodiment, an administrator associated with the communications exchange system 960 can update rates maintained by the rate table provider system 966. For example, the administrator can obtain updated price decks, or call rates for processing different calls to different locations or numbers and can provide these updated price decks to the rate table provider system 966. Alternatively, the communications carrier systems, such as the communications carrier system 932, or associated organizations, can provide the updated price decks to the rate table provider system 966, such as by communicating the rate decks to the rate table provider system 966 via the Internet.

Advantageously, in some embodiments, by using the communications exchange system 960, competition between communications carrier organizations to obtain the organization's 950 business may be increased, which can result in better rates for the organization 950. Further, in some embodiments, by using the communications exchange system 960, the organization 950 can determine the communications carrier system or associated communications carrier organization that satisfies call criteria (e.g. price or reliability) on a per call basis. Thus, for example, if the organization associated with the communications carrier system 932 provides the best prices to the New York City region and the organization associated with the communications carrier system 934 provides the best prices to the San Francisco region, the organization 950 can obtain service from both communications carrier organizations instead of selecting only one, thereby obtaining the best price for calls to both New York City and San Francisco instead of only one of the two cities. Moreover, in some embodiments, by maintaining its own rate table provider system 966, the organization 950 can negotiate rates with the communications carrier organizations at any time and on a repeated basis and then provide the rate updates to the rate table provider system 966 without delay.

Example Communications Carrier Selection Process

Figure 10:
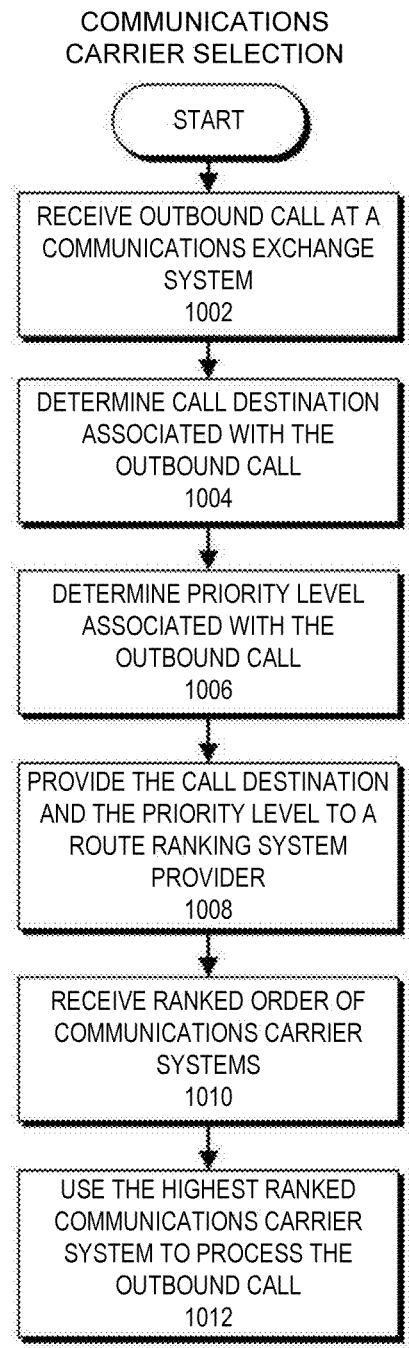
FIG. 10 illustrates a flow diagram for one embodiment of a process for communications carrier selection in accordance with the teachings of the present disclosure.

FIG. 10 illustrates a flow diagram for one embodiment of a process 1000 for communications carrier selection in accordance with the teachings of the present disclosure. The process 1000 can be performed by any system that can select a communications carrier organization or system to process a call. For example, the process 1000 can be performed, at least in part, by a communications exchange system (e.g. the communications exchange system 960), a route ranking system 962, a route ranking system provider 940, or a communications carrier system (e.g. the communications carrier system 932), to name a few. To simplify discussion, the process 1000 will be described as being generally implemented by the communications exchange system 920.

The process begins at block 1002 when, for example, the communications exchange system 920, receives an outbound call from, for example, a user communication device 924 or a high priority user communication device 922. At block 1004, the communications exchange system 920 determines the call destination associated with the outbound call. Determining the call destination can include, for example, determining the destination phone number, the destination geographic location, the destination LATA, or the destination NPA-NXX number, to name a few. At block 1006, the communications exchange system 920 determines a priority level associated with the outbound call. Determining the priority level may include determining one or more criteria on which to base the ranking of communications carrier systems. For example, price, call quality, or dropped call rate. Alternatively, determining the priority level may include accessing a profile associated with the originating user or communication device of the outbound call. In one embodiment, one or more of blocks 1004 and 1006 may be optional.

At block 1008, the communications exchange system 920 provides the call destination and the priority level to a route ranking system provider, such as the route ranking system provider 940. Alternatively, the communications exchange system 920 provides the call to the route ranking system provider 940 enabling the route ranking system provider 940 to determine the call destination and the priority level. In some instances, organization 910 may be associated with a single priority level. In such cases, identifying the priority level is optional.

In some embodiments, the communications exchange system includes a route ranking system (e.g. the communications exchange system 960 of FIG. 9B). When the communications exchange system includes the route ranking system, the communications exchange system can provide one or more of the call, the call destination, and the priority level to the route ranking system at block 1008.

At block 1010, the communications exchange system 920 receives a list of communications carrier systems in ranked order from, for example, the route ranking system provider 940 or the route ranking system 962. As previously described, the ranked order can be based on any criteria provided by the communications exchange system and can be created using, for example, the process 500. At block 1012, the communications exchange system 920 provides the outbound call to the highest ranked communications carrier system to process or complete for the organization 910.

Example Routing Profile Creation User Interface

Figure 11:
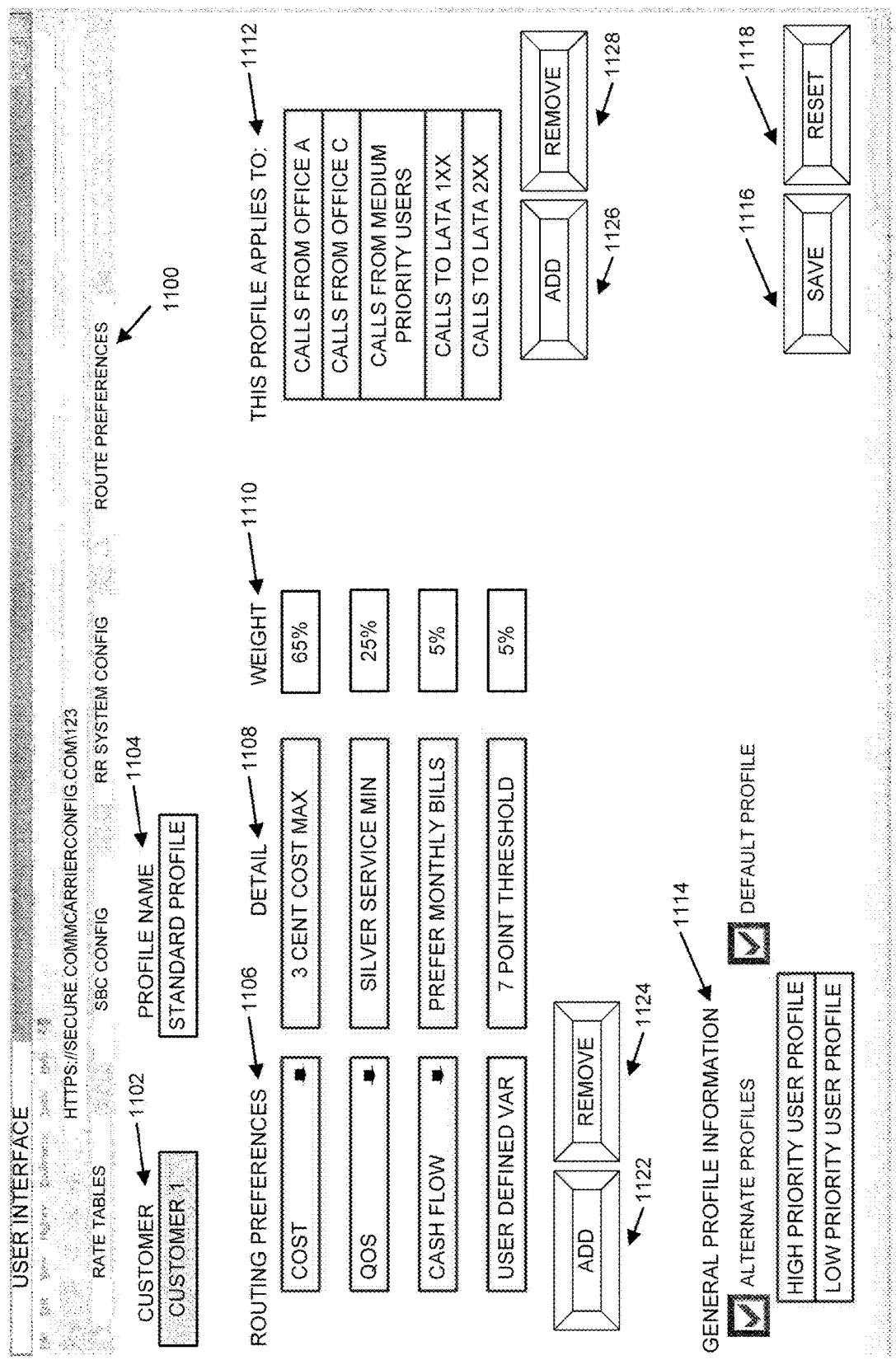
FIG. 11 illustrates an example of a user interface for creating a routing profile in accordance with the teachings of the present disclosure.

FIG. 11 illustrates one non-limiting example of a user interface 1100 for creating a routing profile in accordance with the teachings of the present disclosure. Any number of additional user interface features are possible. Further, some of the user interface features shown in FIG. 11 may be omitted. In addition, the user interface 1100 may be a web interface accessible, for example, via a web browser (as illustrated), or can be any other type of user interface. For example, the user interface 1100 can be a command line interface or a graphical user interface accessed from a stand-alone application instead of a web browser. Moreover, the user interface 1100 is not limited to the illustrated types of input fields. For example, a drop-down box may be replaced with a list box, a free-form text field, or a pop-up dialog box, to name a few.

In some embodiments, the routing profile can be used to facilitate generating a ranked list of communications carrier systems to process a call as described above. The user interface 1100 may be used by an administrator of a communications carrier system (e.g. the communications carrier system 108 or the communications carrier system 932) to create a routing preferences profile for a customer, such as the organization associated with the communications carrier system 106 or the organization 910. Alternatively, or additionally, an administrator associated with a customer of the communications carrier system, which may include another communications carrier system, or an end user customer (e.g. the organization 910), may use the user interface 1100 to create a routing preference profile.

The user interface 1100 can include input fields customer 1102 and profile name 1104, which may be text fields or any other type of input field. The customer 1102 field indicates the customer that is associated with the profile that is being created. The customer 1102 field may be edited by an administrator to select the customer associated with the profile the administrator is creating. Alternatively, as illustrated in FIG. 11 by the grayed out input field, the customer 1102 field may be a read-only field that displays the identity of the customer who is creating the profile. The identity of the customer may be determined, for example, based on the identity of the customer who logged into the user interface. The profile name 1104 field enables the user of the user interface 1100 to specify a name for the profile.

In order to define preferences for ranking communications carrier systems, or associated communications carrier organizations, the user interface 1100 can include a set of routing preferences fields 1106, routing detail fields 1108 and weight fields 1110. The routing preferences fields 1106 can include a series of input fields from which a user can select from available criteria to create a ranked routing list of communications carrier systems for processing a call. For example, as illustrated, the criteria can include cost, quality of service, or cash flow. Further, the criteria may include a user defined factor or variable. Generally, the available criteria can include any of the criteria described above in relation to the vendor ranking modules 204.

The routing detail fields 1108 can generally include any type of field for specifying a rule associated with the corresponding criteria for creating the ranked routing list of communications carrier systems for processing a call. The rule may specify a maximum or minimum threshold, a preference, or a requirement. For example, as illustrated in FIG. 11, the maximum cost threshold for a call can be 3-cents and a minimum quality of service can be silver service, as defined by the communications carrier organization. Further, the routing criteria can include a preference for monthly billing. In addition, as illustrated, the routing detail fields 1108 can include a value associated with a user defined variable.

The weight fields 1110 specify how much weight to assign to each criterion used in creating the ranked list of communications carrier systems for processing a call. As illustrated, the weight can be a percentile value such that the weight assigned to the criteria as a whole totals 100%. Alternatively, the weight can be based on multiplier values. For example, the cost can be associated with a 5× multiplier, the quality of service with a 3× multiplier, and the cash flow and the user defined variable can each be associated with 1× multipliers.

Although FIG. 11 illustrates four criteria in the routing preferences fields 1106 and corresponding routing detail fields 1108 and weight fields 1110, any number of criteria can be specified using the user interface 1100. For example, by selecting the add button 1122, a user can add a new row including an input field for a routing preference, a routing detail, and a weight. Similarly, by selecting the remove button 1124, a user can remove a routing preference entry and corresponding routing detail and weight.

Using a profile assignment field 1112, a user can specify the circumstances for when the profile is applicable. For example, the user may specify that the profile is applicable for calls from a particular office, calls initiated by a user of a specified priority level, calls to a particular geographic area (e.g. Illinois, Canada, or LATA 1xx), calls initiated at a particular time of day, or calls initiated on a particular day of the week, to name a few. A user can select the add button 1126 to add another entry to the profile assignment field 1112. Similarly, a user can select the remove button 1128 to remove an entry from the profile assignment field 1112.

The user interface 1100 can also include a general profile information panel 1114 where a user can indicate whether a profile is a default profile and whether any alternative profiles exist associated with the customer identified in the customer 1102 field. For example, the user may have created different profiles for calls initiated by high priority and low priority users. Further, the user can specify whether the profile is the default profile for processing calls not associated with a specific profile. For example, if the alternative profiles are not associated with processing calls from Office B, the default profile may be used to process calls initiated from Office B.

The user interface may also include a save button 1116 and a reset button 1118. The user may select the save button 1116 to save the profile. Similarly, the user may select the reset button 1118 to clear the fields of the user interface 1100 thereby enabling the user to create a new profile.

The following examples illustrate how the user interface of FIG. 11 may be used to specify route preferences and the impact of the route preference on call handling. In one example, an administrator may specify that calls received from a customer should be routed to vendors that cost the least and provide platinum quality of service. The administrator may specify the cost routing preference by selecting cost using the routing preferences field 1106 and by specifying "lowest" in the routing detail field 1108. Further, the administrator may specify the quality of service routing preference by selecting QoS using the routing preference field 1106 and may specify platinum in the routing detail field 1108. The administrator may value the QoS more than the cost and may thus weight the QoS preference higher than the cost in the weight field 1110. The administrator can then specify that these routing preferences apply calls received from the customer by specifying an identifier associated with the customer in the profile assignment field 1112. Alternatively, the administrator may specify that the routing preferences apply to all customers, or to calls to a certain region. When a call is received from the customer associated with the routing preference profile, the route ranking system can generate a list of routes based on the routing preference profile and using, for example, the process 500.

In a second example, an organization, via an employee of the organization, may create a routing preferences profile using the user interface 1100. The organization may specify that for Office A or for all high priority users, the list of potential communications carriers that can process a call should be ranked based on the amount of pre-paid credit the organization has with the communications carrier, and a discount rate the organization has negotiated with the communications carrier. This discount rate may be a user defined variable specific to the organization. Thus, in the routing preference field 1106, the organization may enter the discount rate as a routing preference, and in the routing detail field 1108, the organization may specify "highest" to indicate that communications carriers that provide greater discounts should be ranked ahead of communications carriers that give lesser discounts. The various discount rates negotiate by the organization may be provided via a rate table associated with the organization or can be associated with the organization's profile. The organization may weigh pre-paid credit equally with discount rates and may thus weight both routing preference equally using the weight field 1110. When a call is received from the organization associated with the routing preference profile, the route ranking system can generate a list of routes based on the routing preference profile and using, for example, the process 500. The organization can then use the list of routes to decide to which communications carrier the organization will provide the call for processing.

Example User Interface for Loading a New Rate Table

Figure 12:
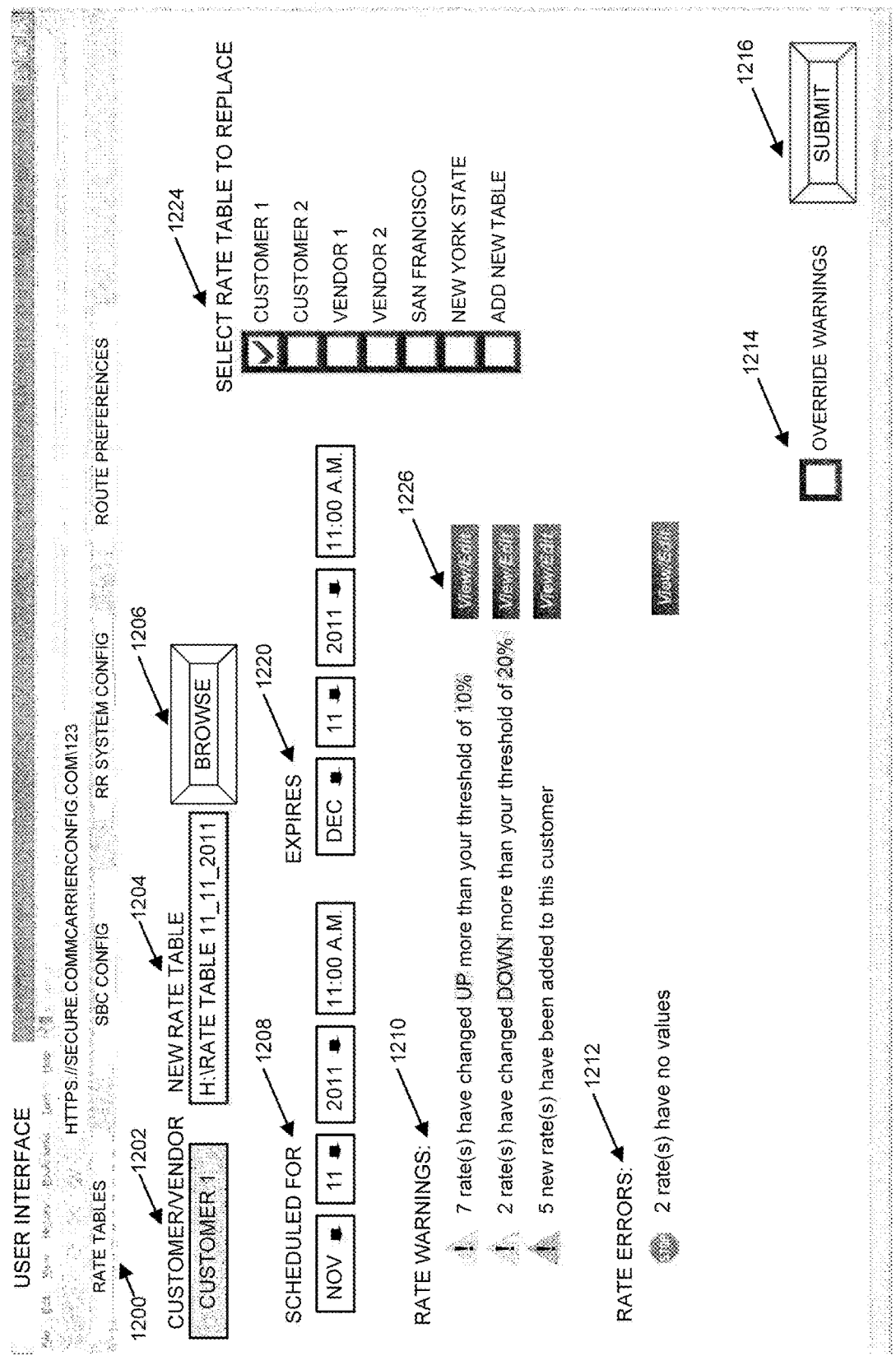
FIG. 12 illustrates an example of a user interface for loading a new rate table in accordance with the teachings of the present disclosure.

FIG. 12 illustrates an example of a user interface 1200 for loading a new rate table in accordance with the teachings of the present disclosure. Any number of additional user interface features are possible. Further, some of the user interface features shown in FIG. 12 may be omitted. In addition the user interface 1200 may be a web interface accessible, for example, via a web browser (as illustrated), or can be any other type of user interface. For example, the user interface 1200 can be a command line interface or a graphical user interface accessed from a stand-alone application instead of a web browser. Moreover, the user interface 1200 is not limited to the illustrated types of input fields. For example, a drop-down box may be replaced with a list box, a free-form text field, or a pop-up dialog box, to name a few.

In some embodiments, a user can use the user interface 1200 to provide a rate table provider system with access to a new rate table (e.g. the stage rate table provider system 260) thereby enabling a route ranking system to access the new rate table as described above. The user can be an administrator associated with the communications carrier system that includes the rate table provider system and the route ranking system. Alternatively, the user can be associated with a vendor that is providing a new set of rates to a communications carrier system or to an organization that uses a communications exchange system as described above.

The user interface 1200 can include input fields customer/vendor 1202 and new rate table 1204, which may be text fields or any other type of input field. The customer/vendor 1202 field indicates the customer or vendor that is associated with the rate table the user is loading. Generally, the rate table can include a set of rates a vendor charges for processing calls and/or a set of rates for processing calls on behalf of a customer. The rates may be based on or associated with any factor. For example, the rates may be based, at least in part, on one or more of the following: call destination, call type, time of day, and number of calls processed within a time period, to name a few. Further, a vendor may also be a customer and vice versa.

In some embodiments, the customer/vendor 1202 field may be replaced by a geographic region field or any other field for identifying a call zone or region. The rate tables may then specify rates for all customers or vendors for processing a call to the geographic region or call region.

The customer/vendor 1202 field may be edited by an administrator to select the customer or vendor associated with the new rate table. Alternatively, as illustrated in FIG. 12 by the grayed out input field, the customer/vendor 1202 field may be a read-only field that displays the identity of the customer or vendor who is associated with the new rate table. The identity of the customer or vendor may be determined, for example, based on the identity of the customer or vendor who logged into the user interface. Although a customer may be able to access the user interface 1200, generally, unless the customer is also a vendor, the customer will not have the capability to submit new rate tables.

The new rate table 1204 field enables the user of the user interface 1200 to specify the name and location of the new rate table. Further, the user interface 1200 may include a browse button 1206. The user may select the browse button 1206 to create a browse window enabling the user to browse files in a file tree and to select a rate table from the file tree. The new rate table 1204 field can display the name and the location of the selected new rate table.

The user interface 1200 may also include date and time fields 1208 and 1220. The date and time field 1208 can be used to specify when the communications carrier system should begin using the new rate table. The date and time field 1220 can be used to specify when the communications carrier system should cease using the new rate table. Each of the date and time fields 1208 and 1220 may be optional. For example, the new rate table may be used as soon as it is loaded, and may remain in effect until replaced or removed.

By using the rate table list 1224, a user of the user interface 1200 can specify the existing rate table to be replaced by the new rate table. If the new rate table is associated with, for example, a new vendor, a new customer, or a new service region, the user can select the "add new table" option from the rate table list 1224.

The rate warnings panel 1210 can present any warnings associated with the new rate table. A system manufacturer, an administrator, or the user who is providing the rate table, for example, can predefine the types of warnings and the warning triggers. The warning triggers can include any characteristics of the new rate table that do not satisfy one or more predetermined criteria or thresholds. For example, the warning triggers may include missing rates for a customer or location, rates that increase or decrease more than a threshold, the inclusion of new rates associated with a customer or location, or duplicate rate entries, to name a few. Further, the warnings may include any type of warning relating to providing a new rate table. This can include, for example, warnings related to rates that increased or decreased more than a threshold and the inclusion with the rate table of new rate entries (e.g. rates associated with new service regions or for new types of service, such as fax calls). Further, the warnings may be triggered as a result of performing the process 800 described above with respect to FIG. 8. The user may select a view/edit button 1226 associated with a warning to view or edit the rate that caused the warning displayed on the rate warnings panel 1210. In some embodiments, the user may override any warnings by selecting the override warnings checkbox 1214. The user may then submit the new rate table by selecting the submit button 1216.

The user interface 1200 may also include a rate errors panel 1212 that can present any errors associated with the new rate table. A system manufacturer, an administrator, or the user who is providing the rate table, for example, can predefine the types of errors and the error triggers. The error triggers can include any characteristics of the new rate table that do not satisfy one or more predetermined criteria or thresholds. For example, the error triggers may include missing rates for a customer or location, rates that increase or decrease more than a threshold, the inclusion of new rates associated with a customer or location, or duplicate rate entries, to name a few. Further, the errors may include any type of error relating to providing a new rate table. This can include, for example, errors related to rates that increased or decreased more than a threshold, the inclusion with the rate table of new rate entries, or rate entries that are missing values. The thresholds that trigger errors may differ from the thresholds that trigger warnings. For example, a rate increase in excess of 10% may only trigger a warning, but a rate increase in excess of 20% may trigger an error. In some embodiments, the errors may be triggered as a result of performing the process 800 described above with respect to FIG. 8. The user may select a view/edit button 1226 associated with an error to view or edit the rate that caused the error displayed on the rate errors panel 1212.

Unlike a warning, in the example illustrated in FIG. 12, a user cannot override an error. However, in some embodiments, users may be able to override both warnings and errors. In other embodiments, neither errors nor warnings may be overridden. Alternatively, only certain users may be able to override warnings and/or errors. For example, an administrator may be able to override errors and warnings, but a vendor may only be able to override warnings.

Other Implementation Details

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as application-specific electronic hardware, computer software executed by computer hardware, or a combination of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. For example, the route ranking system 202 can be implemented by one or more computer systems or by a computer system including one or more processors. As a second example, the communications carrier system 108 of FIG. 1 may be implemented in an appropriate combination of computer hardware and software. For instance, each block 120, 122, 124 can be implemented as a respective general or special purpose computer or computer system programmed with executable code. Alternatively, two or more of these blocks 120, 122, 124 can be implemented, in whole or in part, by the same computer or computer system. Moreover, the described functionality can be implemented in varying ways for each particular application of the systems described herein, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method for routing a call based on a call routing list, comprising:
   as implemented by a computing system comprising one or more hardware processors,
   receiving call information associated with a call, wherein the call information comprises a call origin associated with the call, a call destination associated with the call, and an identity of a customer associated with the call;
   determining a customer rate based on the call destination and the identity of the customer;
   determining, by accessing one or more rate tables, a set of vendor rates corresponding to a set of vendors associated with the call destination;
   determining preference information associated with one or more of the customer, the call destination, or a call type associated with the call;
   generating a ranked order routing list based on one or more of the preference information, the set of vendor rates, or the customer rate, wherein the ranked order routing list includes at least a first route and a second route that are arranged in a priority order and usable to complete the call;
based on the first route having the highest priority in the ranked order routing list for being used to complete the call, attempting to route the call using the first route included in the ranked order routing list;
determining that the call was not successfully routed using the first route; and
based on the second route having the second highest priority in the ranked order routing list for being used to complete the call, routing the call using the second route included in the ranked order routing list.

2. The computer-implemented method of claim 1, further comprising determining the call type associated with the call based on the received call information, wherein the call type is one of an international call, an interstate call, an intrastate call, a fax call, a modem call, a toll-free call, or a premium-rate call.

3. The computer-implemented method of claim 2, further comprising rejecting the call based on the call type being a restricted call type.

4. The computer-implemented method of claim 1, wherein determining the preference information comprises accessing a set of preferences associated with one or more of the customer, the call type, or the call destination.

5. The computer-implemented method of claim 1, wherein the ranked order routing list specifies a set of vendors, communication ports associated with the set of vendors, and specific routes associated with the set of vendors.

6. The computer-implemented method of claim 1, wherein the ranked order routing list is generated further based on one or more of the call type, vendor ratings associated with the set of vendors, or margins associated with the set of vendors.

7. The computer-implemented method of claim 1, wherein determining the customer rate comprises accessing the customer rate from a customer rate table store associated with the call destination and the customer.

8. The computer-implemented method of claim 1, wherein determining the preference information comprises selecting a subset of vendor determination factors from a set of vendor determination factors.

9. The computer-implemented method of claim 8, further comprising applying predetermined weights to the subset of vendor determination factors, and determining the ranked order routing list using the weighted subset of vendor determination factors.

10. The computer-implemented method of claim 9, wherein the predetermined weights are specified at least in part by the customer associated with the call.

11. A system comprising:
one or more memories storing computer-executable instructions; and
one or more hardware processors configured to execute the computer-executable instructions stored on the one or more memories to at least:
receive call information associated with a call, wherein the call information comprises a call origin associated with the call, a call destination associated with the call, and an identity of a customer associated with the call;
determine a customer rate based on the call destination and the identity of the customer;
determine, by accessing one or more rate tables, a set of vendor rates corresponding to a set of vendors associated with the call destination;
determine preference information associated with one or more of the customer, the call destination, or a call type associated with the call;
generate a ranked order routing list based on one or more of the preference information, the set of vendor rates, or the customer rate, wherein the ranked order routing list includes at least a first route and a second route that are arranged in a priority order and usable to complete the call;
based on the first route having the highest priority in the ranked order routing list for being used to complete the call, attempt to route the call using the first route included in the ranked order routing list;
determine that the call was not successfully routed using the first route; and
based on the second route having the second highest priority in the ranked order routing list for being used to complete the call, route the call using the second route included in the ranked order routing list.

12. The system of claim 11, wherein the instructions, when executed by the one or more hardware processors, further cause the one or more hardware processors to determine the call type associated with the call based on the received call information, wherein the call type is one of an international call, an interstate call, an intrastate call, a fax call, a modem call, a toll-free call, or a premium-rate call.

13. The system of claim 11, wherein the ranked order routing list specifies a set of vendors, communication ports associated with the set of vendors, and specific routes associated with the set of vendors.

14. The system of claim 11, wherein the ranked order routing list is generated further based on one or more of the call type, vendor ratings associated with the set of vendors, or margins associated with the set of vendors.

15. The system of claim 11, wherein determining the preference information comprises selecting a subset of vendor determination factors from a set of vendor determination factors.

16. A non-transitory computer-readable storage medium storing computer-executable instructions that, when executed by one or more computing devices, configure the one or more computing devices to perform operations comprising:
receiving call information associated with a call, wherein the call information comprises a call origin associated with the call, a call destination associated with the call, and an identity of a customer associated with the call;
determining a customer rate based on the call destination and the identity of the customer;
determining, by accessing one or more rate tables, a set of vendor rates corresponding to a set of vendors associated with the call destination;
determining preference information associated with one or more of the customer, the call destination, or a call type associated with the call;
generating a ranked order routing list based on one or more of the preference information, the set of vendor rates, or the customer rate, wherein the ranked order routing list includes at least a first route and a second route that are arranged in a priority order and usable to complete the call;
based on the first route having the highest priority in the ranked order routing list for being used to complete the call, attempting to route the call using the first route included in the ranked order routing list;

determining that the call was not successfully routed using the first route; and based on the second route having the second highest priority in the ranked order routing list for being used to complete the call, routing the call using the second route included in the ranked order routing list.

17. The non-transitory computer-readable storage medium of claim 16, wherein the operations further comprise determining the call type associated with the call based on the received call information, wherein the call type is one of an international call, an interstate call, an intrastate call, a fax call, a modem call, a toll-free call, or a premium-rate call.

18. The non-transitory computer-readable storage medium of claim 16, wherein the ranked order routing list specifies a set of vendors, communication ports associated with the set of vendors, and specific routes associated with the set of vendors.

19. The non-transitory computer-readable storage medium of claim 16, wherein the ranked order routing list is generated further based on one or more of the call type, vendor ratings associated with the set of vendors, or margins associated with the set of vendors.

20. The non-transitory computer-readable storage medium of claim 16, wherein determining the preference information comprises selecting a subset of vendor determination factors from a set of vendor determination factors.

* * * * *